US008349617B2

(12) United States Patent
Weiss et al.

(10) Patent No.: US 8,349,617 B2
(45) Date of Patent: Jan. 8, 2013

(54) OPTICAL SENSOR COMPRISING DIFFRACTION GRATINGS WITH FUNCTIONALIZED PORES AND METHOD OF DETECTING ANALYTES USING THE SENSOR

(75) Inventors: Sharon M. Weiss, Franklin, TN (US); Judson D. Ryckman, Nashville, TN (US); Christopher Kang, Nashville, TN (US); Marco Liscidini, Pavia (IT); John E. Sipe, Toronto (CA)

(73) Assignee: Vanderbilt University, Nashville, TN (US)

( * ) Notice: Subject to any disclaimer, the term of this patent is extended or adjusted under 35 U.S.C. 154(b) by 236 days.

(21) Appl. No.: 12/790,905

(22) Filed: May 31, 2010

(65) Prior Publication Data

US 2011/0059538 A1    Mar. 10, 2011

Related U.S. Application Data

(60) Provisional application No. 61/182,451, filed on May 29, 2009.

(51) Int. Cl.
*G01N 21/03* (2006.01)

(52) U.S. Cl. ....... 436/165; 436/164; 436/86; 422/82.05; 422/82.09

(58) Field of Classification Search ........................ None
See application file for complete search history.

(56) References Cited

U.S. PATENT DOCUMENTS

| | | | |
|---|---|---|---|
| 5,468,606 A | 11/1995 | Bogart et al. | |
| 6,248,539 B1 | 6/2001 | Ghadiri et al. | |
| 7,027,163 B2 | 4/2006 | Angeley | |
| 7,195,733 B2 | 3/2007 | Rogers et al. | |
| 7,226,733 B2 | 6/2007 | Chan et al. | |
| 7,271,896 B2 | 9/2007 | Chan et al. | |
| 7,410,763 B2 | 8/2008 | Su et al. | |
| 7,517,656 B2 | 4/2009 | Martin et al. | |
| 7,618,250 B2 | 11/2009 | Van Santen et al. | |
| 7,692,771 B2 | 4/2010 | Kolesnychenko et al. | |
| 2005/0186515 A1 | 8/2005 | Watkins | |
| 2006/0063178 A1* | 3/2006 | Rauh-Adelmann et al. | ...... 435/6 |
| 2008/0157235 A1 | 7/2008 | Rogers et al. | |
| 2009/0140458 A1 | 6/2009 | Xu et al. | |
| 2009/0273119 A1 | 11/2009 | Imai | |
| 2010/0084376 A1 | 4/2010 | Khusnatdinov et al. | |
| 2011/0056398 A1 | 3/2011 | Weiss | |

OTHER PUBLICATIONS

Hrudey et al. "Variable diffraction gratings using nanoporous electrodes and electrophoresis of dye ions", Nanoengineering: Fabrication, Properties, Optics, and Devices IV, edited by Elizabeth A. Dobisz, Louay A. Eldada, Proc. of SPIE vol. 6645, 66450K, (2007) •.*

(Continued)

*Primary Examiner* — Yelena G Gakh
(74) *Attorney, Agent, or Firm* — Michael Best & Friedrich LLP

(57) ABSTRACT

Diffraction gratings comprising a substrate with protrusions extending therefrom. In one embodiment, the protrusions are made of a porous material, for example porous silicon with a porosity of greater than about 10%. The diffraction grating may also be constructed from multiple layers of porous material, for example porous silicon with a porosity of greater than about 10%, with protrusion of attached thereto. In some embodiments the protrusions may be made from photoresist or another polymeric material. The gratings are the basis for sensitive sensors. In some embodiments, the sensors are functionalized with selective binding species, to produce sensors that specifically bind to target molecules, for example chemical or biological species of interest.

32 Claims, 25 Drawing Sheets

OTHER PUBLICATIONS

Alexander, T.A. et al., "Characterization of a commercialized SERS-active substrate and its application to the identification of intact *Bacillus* endospores," Appl. Optics (2007) 46(18):3878-3890.

Chu, Y. et al., "Double-resonance plasmon substrates for surface-enhanced raman scattering with enhancement at excitation and stokes frequencies," ACS Nano (2010) 4:2804-2810.

Ciesielski, P.N. et al., "Functionalized nanoporous gold leaf electrode films for the immobilization of photosystem I," ACS Nano (2008) 2:2465-2472.

Ding, Y. et al., "Nanoporous gold leaf: 'ancient technology'/advanced material," Adv. Mater. (2004) 16(21):1897-1900.

Jane, A. et al., "Porous silicon biosensors on the advance," Trends in Biotechnology (2009) 27(4):230-239.

Kasuga, T. et al., "Formation of titanium oxide nanotube," Langmuir (1998) 14:3160-3163.

Kneipp, K. et al., "Single molecule detection using surface-enhanced Raman scattering (SERS)" Phys. Rev. Lett. (1997) 78(9):1667-1670.

Kucheyev, S.O. et al., "Surface-enhanced Raman scattering on nanoporous Au," Appl. Phys. Lett. (2006) 89:053102-1-053102-3.

Lang, X.Y. et al., "Geometric effect on surface enhanced Raman scattering of nanoporoud gold: improving Raman scattering by tailoring ligament and nanopore ratios," Appl. Phys. Lett. (2009) 94:213109-1-213109-3.

Li, A.P. et al., "Hexagonal pore arrays with a 50-420nm interpore distance formed by self-organization in anodic alumina," J. Appl. Phys. (1998) 84(11):6023-6026.

Liscidini, M. et al., "Gratings on porous silicon structures for sensing applications," in Conference on Lasers and Electro-Optics/International Quantum Electronics Conference, OSA Technical Digest (Optical Society of America, 2009), paper CMG7, 2 pages.

Liscidini, M. et al., "Scattering-matrix analysis of periodically patterned multilayers with asymmetric unit cells and birefringence media," Physical Review B (2008) 77:035324, 11 pages.

Liscidini, M. et al., Conference abstract submitted to Conference on Lasers and Electro-Optics on Dec. 4, 2008, 2 pages.

Liscidini, M. et al., Conference presentation at Conference on Lasers and Electro-Optics on Jun. 1, 2009, 2 pages.

Moskovits, M. "Surface-enhanced spectroscopy," Rev. Mod. Phys. (1985) 57:783-826.

Qian, L.H. et al., "Surface enhanced Raman scattering of nanoporous gold: smaller pore sizes stronger enhancements," Appl. Phys. Lett. (2007) 90:153120-1-153120-3.

Ryckman, J.D. et al., "Low-cost optical microstructures fabricated by imprinting porous silicon," Advanced Fabrication Technologies for Micro-Nano Optics and Photonics III, edited by Winston V. Schoenfeld, Proc. of SPIE 7591 (2010) 759108-1 to 9.

Ryckman, J.D. et al., "Porous silicon structures for low-cost diffraction-based biosensing," Appl. Phys. Lett. (2010) 96:171103, 3 pages.

Ryckman, J.D. et al., "Micron and submicron sized optical structures fabricated by imprinting porous silicon," Porous Semiconductors—Science and Technology Conference, Valencia, Spain, Mar. 2010, 2 pages.

Sipe, J.E. et al., "Enhancement of diffraction-based biosensing using porous structures and electromagnetic surface states," Proc. of SPIE 7553, 7553OM (Feb. 2010) 7 pages.

Smith, R.L. et al., "Porous silicon formation mechanisms," J. Appl. Phys. (1992) 71:R1-R22.

Wokaun, "Surface enhanced electromagnetic processes," Solid State Phys. (1984) 38:223-294.

Zeon Corporation, Zeonrex Electornic Chemicals, ZEP520A Technical Report, "High Resolution Positive Electron Beam Resist," Version 1.01 (Apr. 2003) 12 pages.

United States Patent Office Action for U.S. Appl. No. 12/790,908 dated Sep. 10, 2012 (6 pages).

\* cited by examiner

US 8,349,617 B2

OPTICAL SENSOR COMPRISING DIFFRACTION GRATINGS WITH FUNCTIONALIZED PORES AND METHOD OF DETECTING ANALYTES USING THE SENSOR

CROSS-REFERENCE TO RELATED APPLICATIONS

This application claims the benefit of priority to U.S. Provisional Patent Application Ser. No. 61/182,451 filed on May 29, 2009, which is incorporated herein by reference in its entirety.

STATEMENT REGARDING FEDERALLY SPONSORED RESEARCH OR DEVELOPMENT

This invention was made with United States Government support under federal Grant No. W911 NF-09-1-0101 awarded by the Army Research Office, and with support of the Center for Nanophase Materials Sciences, which is sponsored at Oak Ridge National Laboratory by the Division of Scientific User Facilities. The United States Government has certain rights in this invention.

BACKGROUND

A growing number of optical biosensing systems rely on expensive and bulky equipment for the high resolution determination of fluorescent or luminescent markers in bioassays and screening devices. This limits the portability of such systems, and may restrict their usefulness in sensing applications outside of a controlled laboratory environment. There is a need for robust biosensors that are inexpensive to fabricate and easy to implement.

SUMMARY

In one aspect, a diffraction grating comprising a substrate having protrusions extending therefrom, the protrusions having a porosity of greater than about 10%. The diffraction grating may be the basis for a sensor additionally comprising a coherent light source and a detector. The sensor may be functionalized with selective binding species.

In another aspect, a method of detecting an analyte comprising a) measuring a first amplitude of a portion of a beam of coherent light reflecting off a diffraction grating, the diffraction grating comprising a substrate having protrusions extending therefrom, the protrusions having a porosity of greater than about 10%, b) contacting the diffraction grating with a fluid suspected to contain an analyte of interest, c) subsequently measuring a second amplitude of a portion of a beam of coherent light reflecting off the diffraction grating, d) comparing the first amplitude and the second amplitude to determine if the analyte of interest is present in the fluid, wherein a difference between the second amplitude compared to the first amplitude is indicative of the presence of the analyte.

In another aspect, a diffraction grating comprising a) a substrate, b) a first porous material adjacent to the substrate, the first porous material having a first porosity of greater than about 10%, c) a second porous material adjacent to the first porous material, the second porous material having a second porosity of greater than about 10%, wherein the first porosity is greater than the second porosity, and d) protrusions extending from the second porous material and having a width of less than about 10 μm. The protrusions may have a porosity of greater than about 10%, or the protrusions may be constructed from a polymeric resist. The diffraction grating may be the basis for a sensor additionally comprising a coherent light source and a detector. The sensor may be functionalized with selective binding species.

In another aspect, a method of detecting an analyte comprising a) measuring a first spatial distribution of a portion of a beam of coherent light reflecting off a diffraction grating, the diffraction grating comprising (i) a substrate, (ii) a first porous material adjacent to the substrate, the first porous material having a first porosity of greater than about 10%, (iii) a second porous material adjacent to the first porous material, the second porous material having a second porosity of greater than about 10%, wherein the first porosity is greater than the second porosity, and (iv) protrusions extending from the second porous material and comprising a polymer resist, the protrusions being adjacent to the second layer of porous material and having a width of less than about 10 μm, b) contacting the diffraction grating with a fluid suspected to contain an analyte of interest, c) subsequently measuring a second spatial distribution of a portion of a beam of coherent light originating from the coherent light source and reflecting off the diffraction grating, d) comparing the first spatial distribution and the second spatial distribution to determine if the analyte of interest is present in the fluid, wherein a difference between the second spatial distribution compared to the first spatial distribution is indicative of the presence of the analyte.

Other aspects of the invention will become apparent by consideration of the detailed description and accompanying drawings.

DETAILED DESCRIPTION

Figure 1:
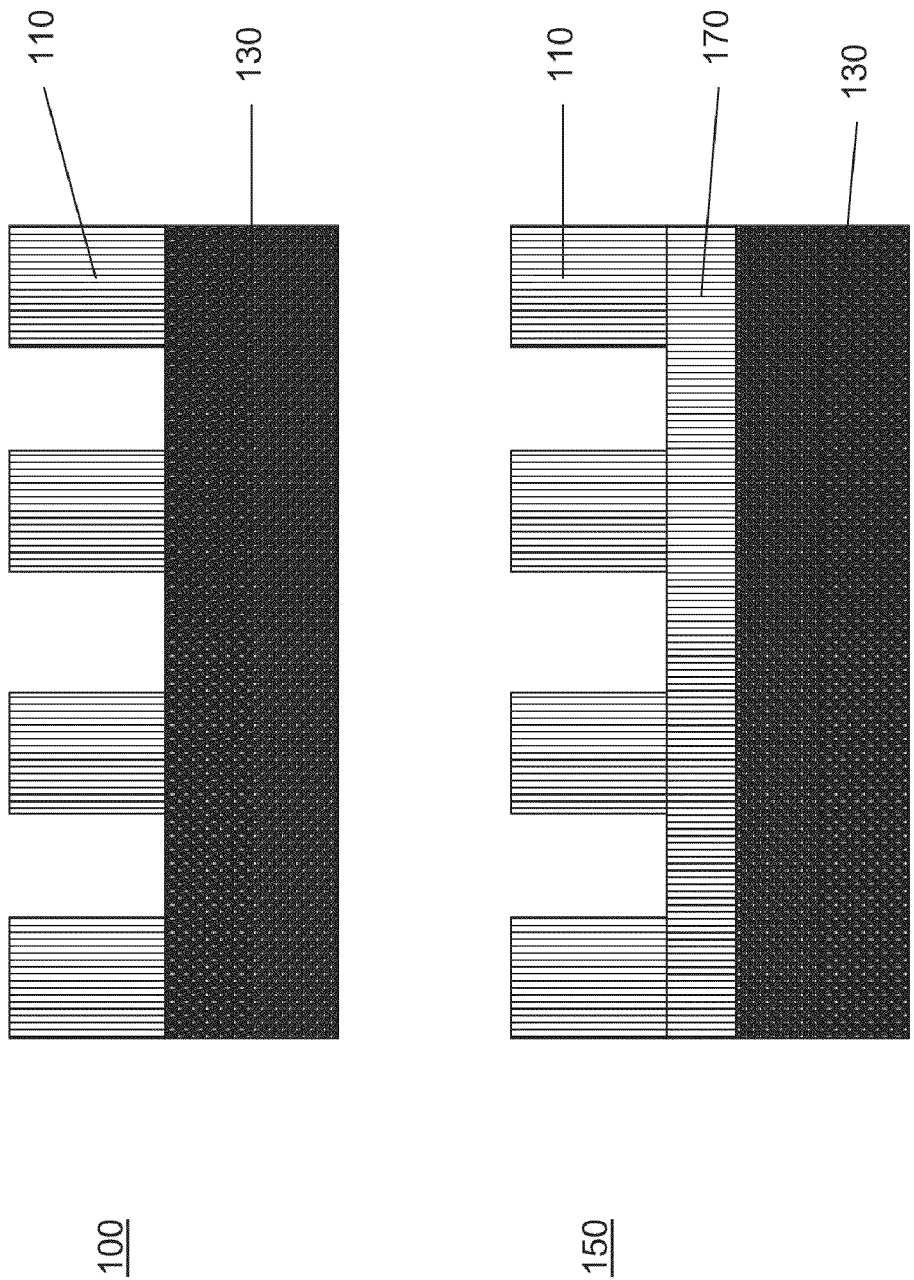
FIG. 1 shows two embodiments of a diffraction grating comprising porous materials.

Described herein are diffraction gratings comprising a substrate with protrusions extending therefrom. The protrusions may be ordered. In one embodiment, the protrusions are made of a porous material, for example porous silicon with a porosity of greater than about 10%. In another embodiment, the diffraction grating is constructed from multiple layers of porous material, for example porous silicon with a porosity of greater than about 10%, with ordered protrusion attached thereto. In some embodiments, the protrusions may be made from photoresist or another polymeric material. Either type of diffraction grating may be the basis for sensitive sensors that are inexpensive and easy to construct. In some cases, the addition of a coherent light source and a detector is sufficient to construct a sensor. In some embodiments, the sensors are functionalized with selective binding species to produce sensors that specifically bind to target molecules. Target molecules include chemical or biological species of interest.

Porous materials, such as, for example, porous silicon ("pSi"), porous alumina ("$pAl_2O_3$"), nanoporous gold ("np-Au"), titanium dioxide nanotube arrays ("$TiO_2$-NTAs"), and many others, are characterized by nanoscale voids and high specific surface area that give rise to desirable optical, electrical, chemical, and mechanical properties. The pores of the material may be smaller than about 10 µm, typically smaller than about 1 µm, and more typically smaller than about 100 µm. The pores may be smaller than about 100 µm, smaller than about 50 µm, smaller than about 10 µm, smaller than about 5 µm, smaller than about 1 µm, smaller than about 500 nm, smaller than about 100 nm, smaller than about 50 nm, smaller than about 10 nm, smaller than about 5 nm. Porous materials that may be used in the structures described herein may include, but need not be limited to, porous silicon, porous gold, porous aluminum, porous copper, porous silver, porous germanium, porous tin, porous silicon dioxide, porous aluminum oxide, porous titanium dioxide, or a mixture thereof. The porous materials may be nanomaterials. As used herein, porosity refers to the ratio of the volume of empty space over the volume of a unit structure, for a particular material. For example, in some embodiments, each protrusion of the grating may be described as a very small porous rectangle L×H×W, and the porosity is the volume of empty space per the L×H×W volume. Because the porosity is a ratio, it is unitless. Porosity may be reported as a decimal number, a fraction, or a percentage. The porosity of the materials used herein may be greater than about 10%, typically greater than about 50%, more typically greater than about 70%. The porosity may be greater than about 10%, about 15%, about 20%, about 25%, about 30%, about 35%, about 40%, about 45%, about 50%, about 55%, about 60%, about 70%, about 75%, about 80%, about 85%, about 90%, or greater than about 95%. Thickness of the porous material commonly can vary from about 50 nm to about 100 µm, and more particularly, from about 100 nm to about 10 µm.

The use of porous materials with large internal surface area is a promising strategy for constructing biosensing devices. Compared to many traditional sensors with limited surface area, porous sensors offer large improvements in device sensitivity, especially for small molecule detection. Additionally, alternative embodiments of the grating allow the porous material to exclude certain sizes of analytes and there is often great flexibility in the design of their physical and optical properties incorporating these porous materials. While the formation of such porous nanomaterials is self-organizing, subsequent micro- and nanometer scale structuring of these materials is necessary for realizing devices with important applications. Many methods of micro and nanostructuring the porous materials to create devices are widely known in the arts of photolithography and semiconductor manufacturing Porous materials offer a large internal surface area (about 100 m$^2$/cm$^3$) and highly tunable pore dimensions, making them particularly interesting for use in a variety of applications including photovoltaics, integrated optics, drug-delivery, and sensing of biological and chemical species. The fabrication of many types of porous materials is remarkably straightforward, as pores are self-organizing and readily produced using electrochemical methods. Precise control over pore morphology can be obtained by varying anodization parameters such as current density, voltage, electrolyte composition, substrate doping, and process temperature. See, e.g., Li et al., "Hexagonal pore arrays with a 50-420 nm interpore distance formed by self-organization in anodic alumina," (1998) J. Appl. Phys. 84, 6023-6026; Ding et al., "Nanoporous gold leaf: 'ancient technology'/advanced material," (2004) Adv. Mater. 16, 1897-1900; Kasuga et al., "Formation of titanium oxide nanotube," (1989) Langmuir 14, 3160-3163; and Smith et al., "Porous silicon formation mechanisms," (1992) J. Appl. Phys. 71, R1-R22, each of which is incorporated by reference in its entirety.

Porous materials may be patterned using photolithographic and etching methods widely available for computer chip manufacture. Additionally micromechanical components can be fabricated using compatible "micromachining" processes that selectively etch away parts of the silicon wafer or add new structural layers to form the mechanical and/or electromechanical components. Other basic construction techniques may include, but need not be limited to, depositing thin films of material on a substrate, applying a patterned mask on top of the films by some lithographic methods, and selectively etching the films. Deposition techniques of use can include chemical procedures such as chemical vapor deposition (CVD), electrodeposition, epitaxy and thermal oxidation and physical procedures like physical vapor deposition (PVD) and casting. Structures produced with these techniques have smallest dimensions on the order of nanometers, however, structures produced with these techniques may be smaller than 100 µm, typically smaller than 10 µm, more typically smaller than 1 µm.

Gratings, and other structures described herein, may also be produced with direct imprinting of the porous materials. These fabrication methods are described in more detail in U.S. patent application Ser. No. 12/790,908 "Direct Imprinting of Porous Substrates" by S. M. Weiss et al., filed May 31, 2010, and incorporated by reference herein in its entirety.

Porous materials may be patterned on the micro- and nanometer scale to create structures of the invention using direct imprinting of porous substrates ("DIPS"). DIPS utilizes reusable stamps that may be directly applied to an underlying porous material to selectively, mechanically deform and/or crush particular regions of the porous material, creating a desired structure. The process can be performed in a matter of seconds, at room temperature or higher temperatures, and eliminates the requirement for intermediate masking materials and etching chemistries.

Stamps used in embodiments of the present application generally have a hardness greater than the hardness of the material being imprinted and can be pre-mastered i.e., they may have a patterned surface or surfaces. Pre-mastering of a stamp can be accomplished through conventional lithographic techniques, such as, for example, photolithography, reactive ion etching, electron beam lithography, wet etching, dry etching, focused ion-beam milling, laser machining, and combinations of these methods. In some embodiments, a pre-mastered stamp may be a reusable stamp. In some embodiments, a stamp material may comprise silicon. In some embodiments, the stamp may comprise a material with a material hardness of at least about 1 GPa, about 3 GPa, about 5 GPa, about 8 GPa, about 10 GPa, about 15 GPa, or at least about 20 GPa.

Applied pressures suitable for methods of the present application may commonly include pressures of about 50 N/mm² to about 500 N/mm², and more particularly, about 100 N/mm² to about 300 N/mm². In some embodiments, the applied pressure may be at least about 50, about 55, about 65, about 70, about 75, about 80, about 85, about 90, about 95, about 100, about 125, about 150, about 175, about 200, about 225, about 250, about 250, about 275, and at least about 300 N/mm².

Imprinting and overstamping may be accomplished by contacting the stamp with the porous material, exerting pressure as set forth above, and removing the stamp as set forth in FIG. 1. Methods of the present application can afford precise control over both lateral and vertical dimensions of patterning in a porous material while maintaining large area uniformity.

In some embodiments of the present application, tunable imprint depths in the range of about 10 nm to about 1 µm, as well as lateral feature sizes below about 100 nm can be realized. The imprints may be less than about 100 µm, about 50 µm, about 20 µm, about 10 µm, about 100 nm, about 95 nm, about 90 nm, about 80 nm, about 75 nm, about 70 nm, about 65 nm, about 60 nm, about 55 nm, about 50 nm, about 45 nm, about 40 nm, about 35 nm, about 30 nm, about 25 nm, about 20 nm, about 15 nm, about 10 nm, about 5 nm, about 3 nm, and less than about 1 nm. The imprints may be greater than about 1 nm, about 5 nm, about 10 nm, about 15 nm, about 20 nm, about 25 nm, about 30 nm, about 35, about 40, about 45, about 50, about 55, about 65, about 70, about 75, about 80, about 85, about 90, about 95, and greater than about 100 nm. In some embodiments, the lateral feature size may be less than about 100 nm, about 95 nm, about 90 nm, about 80 nm, about 75 nm, about 70 nm, about 65 nm, about 60 nm, about 55 nm, about 50 nm, about 45 nm, about 40 nm, about 35 nm, about 30 nm, about 25 nm, about 20 nm, about 15 nm, about 10 nm, about 5 nm, about 3 nm, and less than about 1 nm. Imprinted structures may be characterized by scanning electron microscopy ("SEM"), atomic force microscopy ("AFM"), and optical diffraction experiments.

Methods of the imprinting can commonly be carried out at temperatures ranging from about 15° C. up to about 1,200° C., particularly from about 20° C. up to about 200° C., or more particularly from about 21° C. to about 27° C.

In some embodiments, the imprint depth in the porous material can be less than about 1%, less than about 3%, less than about 5%, less than about 8%, less than about 10%, or less than about 15% of the height of the porous material that has not been imprinted. In some embodiments, the imprint depth can be greater than about 1%, greater than about 3%, greater than about 5%, greater than about 7%, greater than about 10%, greater than about 15%, and greater than about 20% of the height of the porous material that has not been imprinted.

In some embodiments, the stamp compresses regions of the porous material by less than about 20%, less than about 17%, less than about 15%, less than about 13%, less than about 10%, less than about 8%, less than about 5%, less than about 3%, less than about 2%, and less than about 1% up to about the porosity of the film (e.g., up to about 80% compression for an 80% porosity pSi, up to about 50% compression for a 50% porosity np-Au, etc.) relative to the porous material that has not been compressed. In some embodiments, the stamp can compress regions of the porous material by at least about 3%, at least about 5%, at least about 8%, at least about 10%, at least about 13%, at least about 15%, at least about 18%, at least about 20%, at least about 25%, at least about 30%, at least about 35%, or at least about 40% relative to the porous material that has not been compressed.

In some embodiments, the stamp can be in contact with the porous material for about one second to about 2 minutes, particularly from about 1 second to about 5 seconds. In other embodiments, the stamp can be in contact for less than one second, and less than one half of one second.

In some embodiments, a single stamp may be used to contact the porous material at least a second time, where the stamp can be rotated, for example, greater than 90 degrees, about 90 degrees, or less than 90 degrees, between imprinting the porous material a first time and imprinting the porous material at least a second time. In some embodiments, more than one stamp may be used to contact the porous material, where the second stamp may include the same pattern as the first stamp or a different pattern than the first stamp. The second stamp may also be used to contact the porous material at least a second time, where the second stamp can be rotated, for example, greater than 90 degrees, about 90 degrees, or less than 90 degrees, between imprinting the porous material a first time with the second stamp and imprinting the porous material at least a second time with the second stamp.

In some embodiments, overstamping may produce a freestanding nanoparticle or microparticle. Generally, to produce a freestanding nanoparticle or microparticle, some region of the film can be imprinted to a significant fraction, i.e. approaching the original porosity of the film. For example, in some embodiments a first imprint fraction can be greater than 70%, followed by a second imprint region, imprinted often at least to about 10%. For example, in one method of imprinting a 9 mm$^2$ stamp can be applied to single layer thin films of porous silicon with a force on the order of 1 kN.

Semiconductor materials and substrates that can be used with the invention may comprise a single semiconductor material, a combination of semiconductor materials that are unmixed, or a mixture of semiconductor materials. Using modern photolithographic techniques it is understood that the techniques described herein could be used to produce massively parallel structures that contained, for example, 10,000 gratings of the invention on a single 6" silicon wafer. In one embodiment, multiple gratings of the array could be functionalized with different specific binding molecules, providing a device that could screen for multiple specific chemical or biological agents simultaneously. For example, an array functionalized with a variety of antibodies may be used for proteomic studies or diagnostic screening.

Simple diffraction gratings (100 and 150) having porous protrusions are shown in FIG. 1. The grating 100 comprises protrusions 110 extending from a substrate 130. In an alternative embodiment, the grating 150 comprises protrusions 110 extending from a porous layer 170. The porous layer 170 is adjacent to a substrate 130. As described above, the protrusions may be created with lithography, etching, or with imprinting. In one embodiment, a porous layer (not shown) may be imprinted with a stamp to create a grating 150. Depending upon the materials used for the porous layer (not shown) in the imprinting process, the porous structure of the layer is modified such that protrusions 110 will have the same porosity as the initial porous layer as will underlying porous layer 170. The porosities of the exemplary structures in FIG. 1 may be chosen such that protrusion 110 has the same porosity as porous layer 170, protrusion 110 has a greater porosity than porous layer 170, or protrusion 110 has less porosity than porous layer 170.

Figure 2:
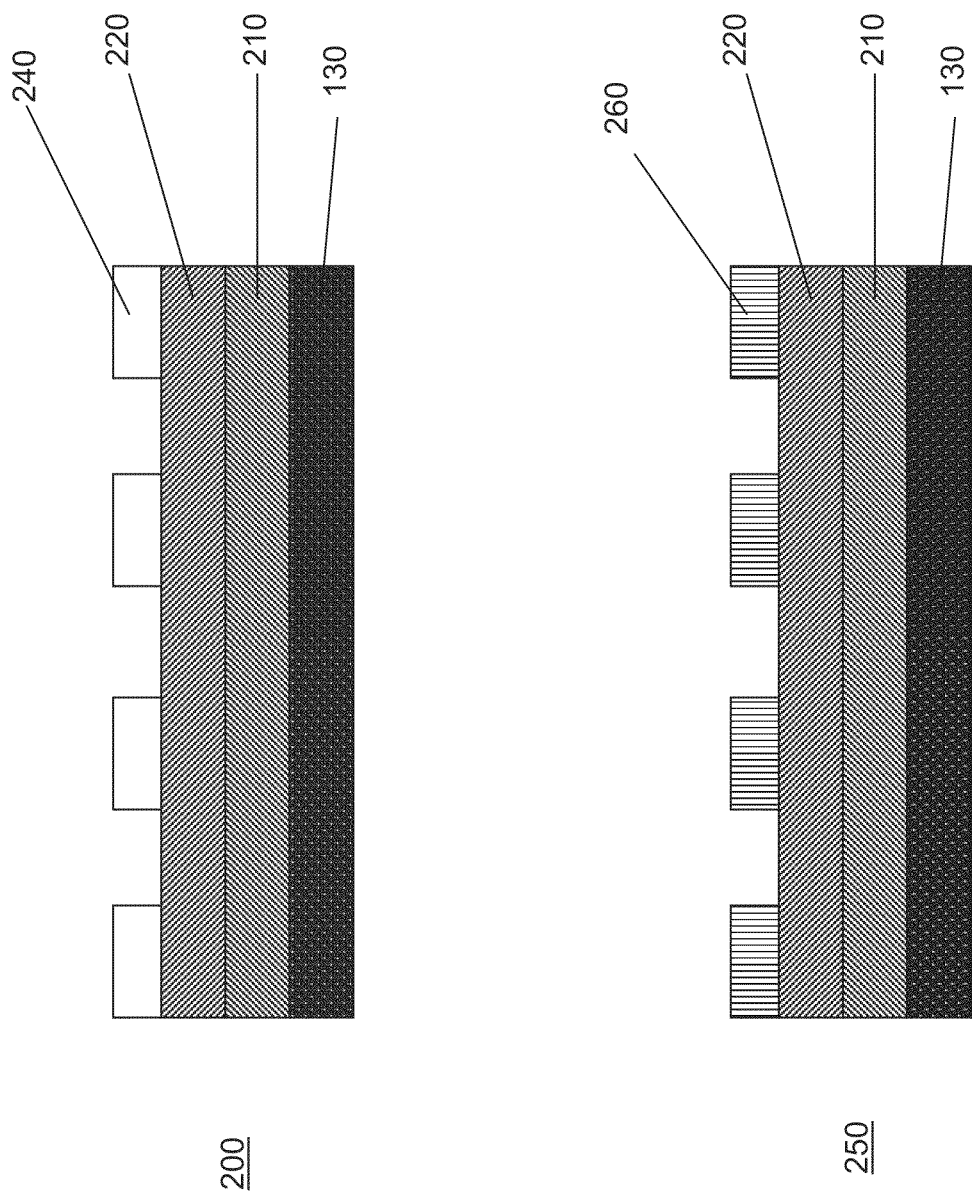
FIG. 2 shows two embodiments of a diffraction grating comprising multiple layers of porous nanomaterials.

In addition to simple diffraction gratings (100 and 150), modified waveguide gratings 200 and 250 (e.g., as shown in FIG. 2) may be provided. A modified wave guide grating with non-porous protrusions 200 may comprise a first porous material 210 adjacent to substrate 130 and second porous material 220 adjacent to first porous material 210. Because the porosity of the second porous material 220 is less than the porosity of the first porous material 210, the first porous material 210 acts as a waveguide for light. The modified wave guide grating with non-porous protrusions 200 has photoresist protrusions 240 which may be spaced in an orderly arrangement to create a grating. A number of commercially available photoresists may be used for photoresist protrusions 240, however, other polymeric materials, including block copolymers may be used. A suitable commercial photoresist is ZEP 520 (Zeon Corp., Tokyo, Japan).

A modified wave guide grating with porous protrusions 250 may comprise a first porous material 210 adjacent to substrate 130 and second porous material 220 adjacent to first porous material 210. Because the porosity of the second porous material 220 is less than the porosity of the first porous material 210, the first porous material 210 acts as a waveguide for light. The modified wave guide grating with porous protrusions 250 has porous protrusions 260 which may be spaced in an orderly arrangement to create a grating. The porosities of the exemplary structures in FIG. 2 may be chosen such that porous protrusion 260 has the same porosity as second porous material 220, porous protrusion 260 has a greater porosity than second porous material 220, or porous protrusion 260 has less porosity than second porous material 220.

The materials and layers described herein may be adjacent to one another. Adjacent may mean directly adjacent (i.e., the materials or layers contact one another) or indirectly adjacent (i.e., one or more additional materials or layers may be found in between).

Diffraction-Based Sensors (DBS) operate at a fixed wavelength and detection angle by exploiting the variation in diffraction efficiency that occurs due to the presence of a chemical or biological species on a diffraction grating. The diffraction efficiency, taken as the ratio of the output power for a selected diffraction order to the input power, is unaffected by fluctuations in the power of the probe laser. In traditional DBSs, chemical or biological species are selectively adsorbed onto the top surface of a diffraction grating, giving rise to an increase in the diffraction efficiency proportional to the change in the grating thickness. Similar to other traditional biosensors, the limited surface area available for biochemical attachment on the gratings ultimately limits the device performance.

Figure 3:
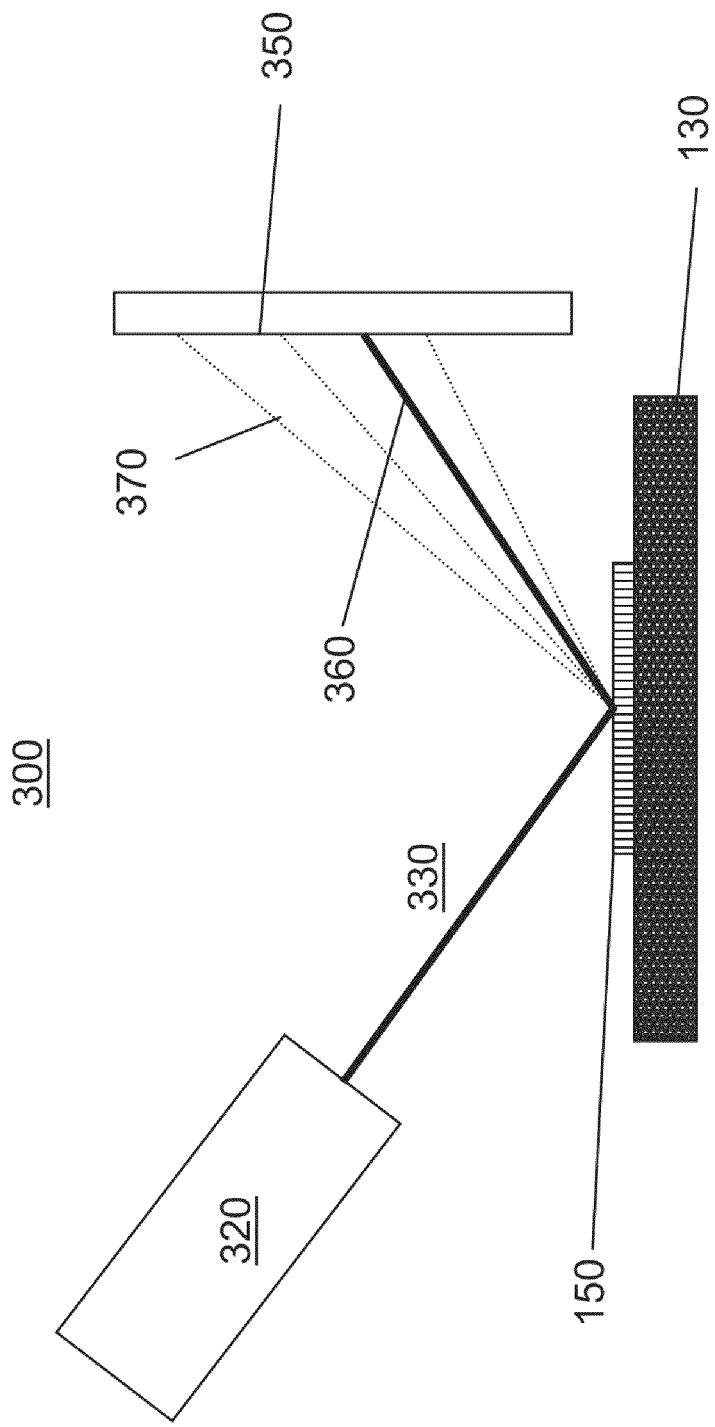
FIG. 3 is a schematic diagram of a sensor comprising a diffraction grating of the invention.

A simplistic diffraction-based sensor (DBS) 300 is shown in FIG. 3. The sensor comprises silicon grating 150 on a substrate, which is illuminated by a beam of coherent light 330 from a coherent light source 320. Any number of coherent light sources may be used, including, but not limited to, lasers and beam lines. The beam of coherent light 330 is scattered from silicon grating 150 to produce a diffraction pattern that strikes a detector 350. Any number of detectors may be used, including, but not limited to, CCD arrays, photodiodes, and photomultiplier tubes. The resulting diffraction pattern has a zero-order mode 360 which is reflected at the normal angle, as well as higher-order modes 370 which are spatially separated.

In traditional diffraction-based sensors, a diffraction grating may be functionalized to be able to adsorb a specific analyte. If the grating height h is much smaller than the wavelength λ of the incident beam, the intensity of the m-th diffraction order scale quadratically with the grating optical thickness h(Δn), where Δn is the refractive index contrast in the grating region. When the analyte is immobilized on the detector surface the grating optical thickness increases and thus so does the fraction of light diffracted. The analyte is then detected by monitoring the diffraction signal. The intensity of the m-th order beam can be written as $$I_m \propto I_{inc} \mu(\kappa_x) \mu(\kappa_d = \kappa_x + mG) \left(\frac{\pi(\Delta n)h}{2\lambda}\right)^2 \quad m \in Z \tag{1}$$

where $I_{inc}$ is the incident field intensity, and $\kappa_x$ and $\kappa_d$ are the wave vector components of incident and diffracted beams along the grating periodicity direction x, respectively. The minimum grating momentum contribution is $G=2\pi/\Lambda$, where $\Lambda$ is the grating period, while $\mu(\kappa_x)$ and $\mu(\kappa_d)$ describe, for a given polarization, the efficiency with which the incident and diffracted beams propagate in the structure. An increase, δh, of the grating height occurs when an analyte is adsorbed onto the grating surface. This gives rise to a change $\Delta\eta$ in the grating diffraction efficiency $I_m/I$inc. When the grating height is smaller than the wavelength and $\delta h$ much smaller than the original grating height, $\Delta\eta$ scales linearly with $\delta h$, which is proportional to the number of analyte molecules adsorbed on the grating surface; the slope of the curve is the device sensitivity. This same model can be used to predict the responsivity of the sensors described herein, however because the analytes are adsorbing to the porous interiors of the grating structures, or rather absorbed by the grating, the refractive index contrast $\Delta n$ is much greater, and results in much higher sensitivity for sensors incorporating porous materials.

Figure 4:
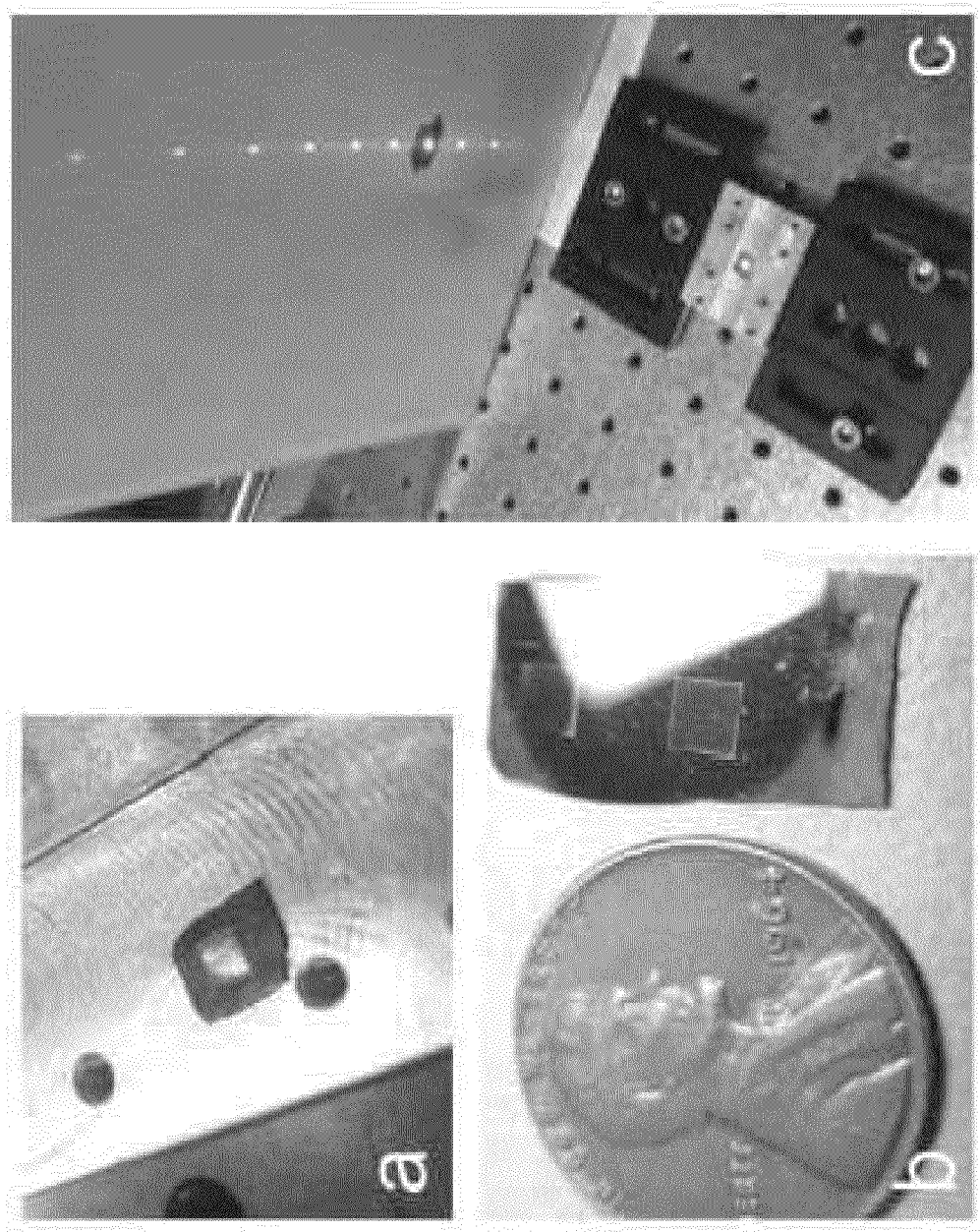
FIG. 4 shows a) a diffraction grating of the invention, b) a size comparison between a diffraction grating of the invention and an American penny, c) a diffraction grating of the invention as it would be used in a sensor of the invention.

A completed grating according to the invention is shown in FIG. 4. As shown in FIGS. 4 a) and b) the actual grating is quite small and fabricated atop a portion of a polished silicon wafer. The grating may be attached to a movable stage, as shown in FIG. 4 c) with a piece of double-stick tape, and arranged to produce the diffractions pattern shown in FIG. 4 c) when a visible laser is used as the coherent light source. It should be noted in FIG. 4 c) that the zero order mode is hitting the black mark on the target. Modes, −2, −1, 1, 2, 3, 4, 5, and 6 are also visible. Modes below −2 are blocked by the edge of the mount.

The simplistic detectors exemplified above may be the basis for more complicated chemical and biological sensors through the incorporation of various fluid filled compartments, for example microfluidic channels or nanochannels. Furthermore, because the gratings and other components of the apparatus can be formed as a single unit, it is straightforward for one of skill in the art to create microcapillary or microfluidic chips with diffraction based sensors. Alternatively, individual components can be separately fabricated and attached together. Any materials known for use in such chips can be used in the disclosed apparatus, for example silicon, silicon dioxide, polydimethyl siloxane, polymethylmethacrylate, plastic, glass, quartz, etc. The sensors can also be arranged in arrays to allow for parallel and duplicative analysis on short time scales.

A detector made using the methods of the invention may be useful for detecting analytes from any source, including, but not limited to air samples, gas samples, bodily fluids, food samples, water samples, homogenized tissue from organisms, etc. Biological samples may include, but need not be limited to, urine, blood, plasma, serum, saliva, semen, stool, sputum, cerebral spinal fluid, tears, exhaled breath, or mucus. The methods may be used to detect the presence of a particular analyte, for example, a nucleic acid, oligonucleotide, protein, enzyme, antibody or antigen. The methods may also be used to screen bioactive agents, e.g. drug candidates, for binding to a particular analyte in a biological sample or to detect the presence of agents, such as pollutants, in a biological sample. As discussed above, any analyte for which a probe moiety, such as a peptide, protein, oligonucleotide or aptamer, may be designed can be detected using the invention methods.

Analytes include chemical and biological species that may be detected by the polynucleotide analytes such as those polynucleotides defined below. These species may include, but are note limited to, chemical agents, small molecules, pharmaceutical compounds, amino acids, hormones, proteins, lipids, genetic material, all the way up to cells, viruses and other microorganisms. An analyte can be in the solid, liquid, gaseous or vapor phase. An "analyte of interest in a fluid" indicates that the species of interest is present in a liquid or a gas sample. It will be recognized that the physical state of the gas or vapor phase can be changed by pressure, temperature as well as by affecting surface tension of a liquid by the presence of or addition of salts etc. Genetic material may include, but need not be limited to, m-RNA, r-RNA, t-RNA, DNA, DNA-RNA duplexes, etc. Analytes may also includes receptors that are polynucleotide binding agents, such as, for example, restriction enzymes, activators, repressors, nucleases, polymerases, histones, repair enzymes, chemotherapeutic agents, and the like, that can be detected using the invention methods.

Additionally, the porous materials may be functionalized with selective binding species to achieve greater specificity. Selective binding species may include, but are not limited to, proteins (including without limitation enzymes, antibodies or fragments thereof), glycoproteins, peptidoglycans, carbohydrates, lipoproteins, a lipoteichoic acid, lipid A, phosphates, nucleic acids that are expressed by certain pathogens (e.g., bacteria, viruses, multicellular fungi, yeasts, protozoans, multicellular parasites, etc.), or organic compounds such as naturally occurring toxins or organic warfare agents, etc. In particular, any number of antibodies may be used to functionalize a sensor to give the sensor specific sensitivity to antigens against which the antibodies are raised. The selective binding species may also be an oligomer of nucleic acids, allowing the sensor to be used for genetic screening. For example, any nucleotides comprising a polynucleotide, such as adenine, cytosine, guanine or thymine linked to 2'-deoxyribose, or ribonucleotides such as adenine, cytosine, guanine or uracil linked to ribose may be used. A polynucleotide or oligonucleotide may also can contain nucleotide analogs, including non-naturally occurring synthetic nucleotides or modified naturally occurring nucleotides. Such nucleotide analogs are well known in the art and commercially available, as are polynucleotides containing such nucleotide analogs.

It is to be understood that the invention is not limited in its application to the details of construction and the arrangement of components set forth in the following description. The invention is capable of other embodiments and of being practiced or of being carried out in various ways. Also it is to be understood that the phraseology and terminology used herein is for the purpose of description and should not be regarded as limiting. The use of "including," "comprising," or "having" and variations thereof herein is meant to encompass the items listed thereafter and equivalents thereof, as well as additional items.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

Further, no admission is made that any reference, including any patent or patent document, cited in this specification constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinency of any of the documents cited herein.

EXAMPLES

Example 1

Fabricating Structures by Imprinting Porous Materials

Preparation of Porous Materials

Methods of producing pSi at various film thicknesses are known in the art. For example, by varying the electrochemical preparation conditions, high porosity ("HP") and low porosity ("LP") films, estimated at about 80% and about 55% respectively, 80% porosity, formed by 80 mA/cm$^2$ current density, 55% formed by 5 mA/cm$^2$, can be prepared.

Samples of pSi were prepared by electrochemical etching of a boron doped p+ type Si(100) with a resistivity of 0.01-0.02 Ωcm and a thickness of 475-550 μm (University Wafer) in a mixture of 49% hydrofluoric acid (HF):ethanol mixture with a ratio of 3:7 (v/v). High-porosity (about 80% porosity) and low-porosity (about 55% porosity) films were electrochemically prepared at current densities of 80 mA cm$^{-2}$ and 5 mA cm$^{-2}$ respectively.

Porosity characterization of pSi films. The reflectance spectra of pSi thin films were measured with a spectrophotometer (Varian Cary 5000 UV-VIS-NIR) and subsequently modeled using a two-component (Si and void) Bruggeman effective medium approximation in a transfer-matrix formalism. This was performed following cross sectional SEM to estimate the original film thickness, and etching rate, for each current density utilized. Aside from optical modeling, porosity can also be estimated by gravimetric methods, wherein the mass of the substrate is measured before porous film formation, after formation, and after dissolution of the film.

Samples of np-Au were prepared from an approximately 1.5×1.5 cm sheet of one hundred nanometer thick Monarch 12 Karat white gold that was dealloyed by floating on concentrated nitric acid (Fisher) for 15 minutes, followed by mounting on substrate supports. The porosity was estimated to be about 50%.

Hexagonally ordered pAl$_2$O$_3$ was prepared by anodization of high purity 0.100 mm thick Al foil (Reynolds Aluminum), in 0.3M oxalic acid electrolyte. The pores were subsequently opened in a bath of phosphoric acid (5% wt) for 90 minutes. TiO$_2$-NTAs were prepared from 0.25 mm thick Ti foil (99.7%, Sigma Aldrich), cut into 2×2 cm squares that were first sonicated in isopropanol and then acetone, each for 10 min. Samples were then anodized at 80V for 5-18 hrs in a two-electrode configuration utilizing a electrolyte solution of NH$_4$F (0.3% by weight) and water (0.1% by volume) in ethylene glycol, and subsequently annealed at 450° C. for 3 hrs with a 3.5 hr ramp up/down time.

Stamp Preparation and Imprinting

Silicon stamps were prepared from the same wafers used to prepare the pSi samples. Standard photolithography and reactive ion etching were used to pattern the microscale (Λ=5, 10 μm) grating stamps. All other stamp patterns were defined by electron-beam lithography followed by: (i) electron-beam evaporation of a 10 nm Cr mask layer, (ii) lift-off in acetone, and (iii) subsequent reactive ion etching to a depth of approximately 0.5 μm (except for the sub-micrometer period gratings, which skipped steps i and ii).

Imprinting was performed with a Tinius Olsen Super L 60K universal testing machine configured to apply a flat metallic plate onto the backside of the stamp, which was fixed face down on the porous material with single sided Scotch Tape. After bringing the plate into contact with the backside of the stamp, a computer-controlled force was delivered and sustained for less than 1 second.

DIPS with pSi

Figure 5:
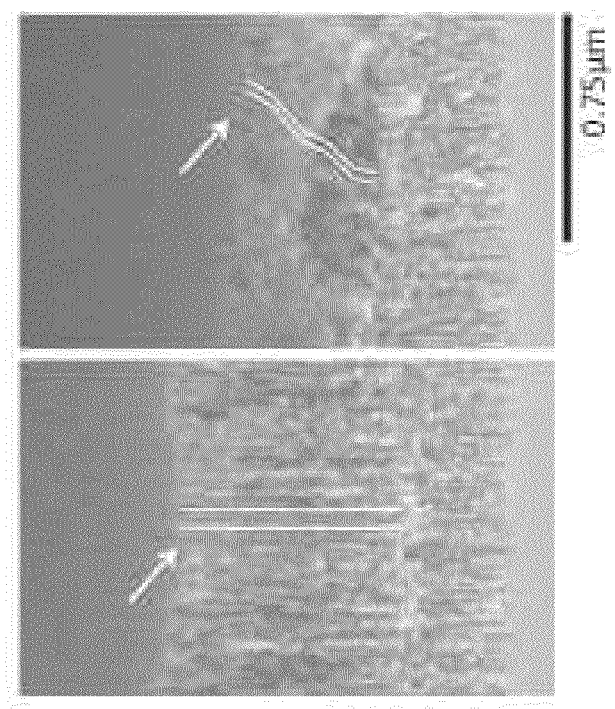
FIG. 5 shows imprinting behavior of an approximately 1 μm thick pSi film.

FIG. 5 shows the imprinting behavior of an approximately 1 μm thick pSi film, with pore diameters on the order of 30-40 nm (prepared by electrochemical etching at 48 mA cm$^{-2}$ for 35 seconds). FIG. 5 (left) shows an SEM image of the pSi film before imprinting. FIG. 5 (right) shows an SEM image of the pSi film after imprinting with a grating patterned stamp (area=9 mm2, Λ=5 um) at a force of about 2 kN. The imprinted regions were compressed to a thickness of approximately 615 nm.

FIG. 5 shows cross-sectional SEM images (45° tilt) of unstamped (left) and stamped (right) regions of a 1 μm thick pSi film (the white arrows indicate highlighted typical pores). As shown in FIG. 5 (right), the mesoporous network accommodated the reduction in volume by bending and compressing pores together. In this case, the porous structure appeared to be contiguous and unbroken.

After DIPS imprinting, the sample was placed back in the electrochemical cell to determine if the densified porous network would prevent the etching of a second layer (20 mA cm$^{-2}$, 30 s). SEM imaging (FIG. 5) revealed that the etching of a second porous layer proceeded uniformly in both the printed and unprinted regions; the ethanolic HF etching solution readily infiltrated the entire imprinted pSi layer, and reinitiated etching where the pores were previously terminated. This opens the possibility of fabricating devices through a multi-step process, where further electrochemical etching can be performed following DIPS.

Grating Coupled pSi Waveguide

Figure 6:
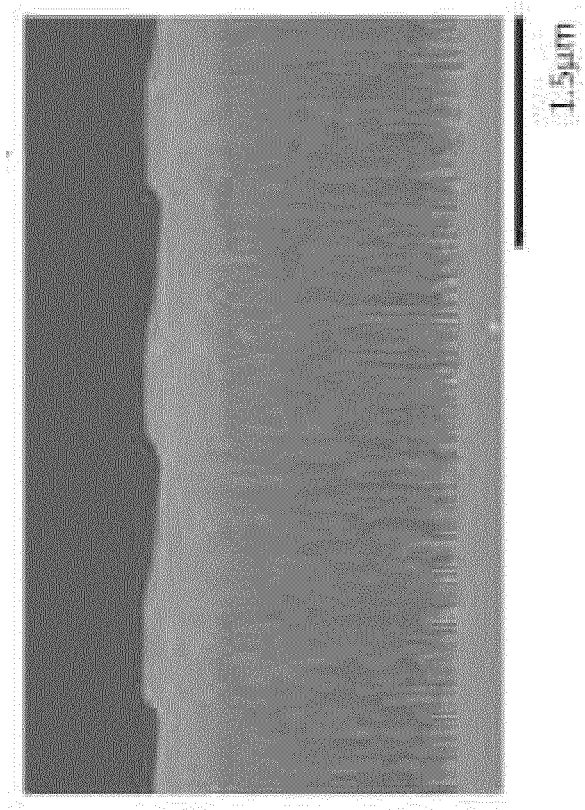
FIG. 6 shows an SEM image of a grating coupled pSi waveguide fabricated with DIPS in a multistep process.

As an example of a device structure that would benefit from a multi-step process, a grating-coupled porous silicon waveguide was prepared (FIG. 6). Grating coupled pSi waveguides function by coupling diffracted light into a waveguide mode which confines light in a high refractive index layer through total internal reflection. A pSi structure can readily achieve the refractive index contrast necessary for waveguiding by modulating the porosity (and thus the effective refractive index).

The structure of FIG. 6 was fabricated by first etching a thin (about 200 nm) high-porosity (about 80%) cladding layer followed by a low porosity (about 55%) waveguiding core layer (about 300 nm thick). DIPS was then performed with a silicon-grating stamp (Λ=1.7 μm), and followed by further electrochemical etching of a 1.5 μm thick high-porosity cladding layer.

Imprint Depth

Figure 7:
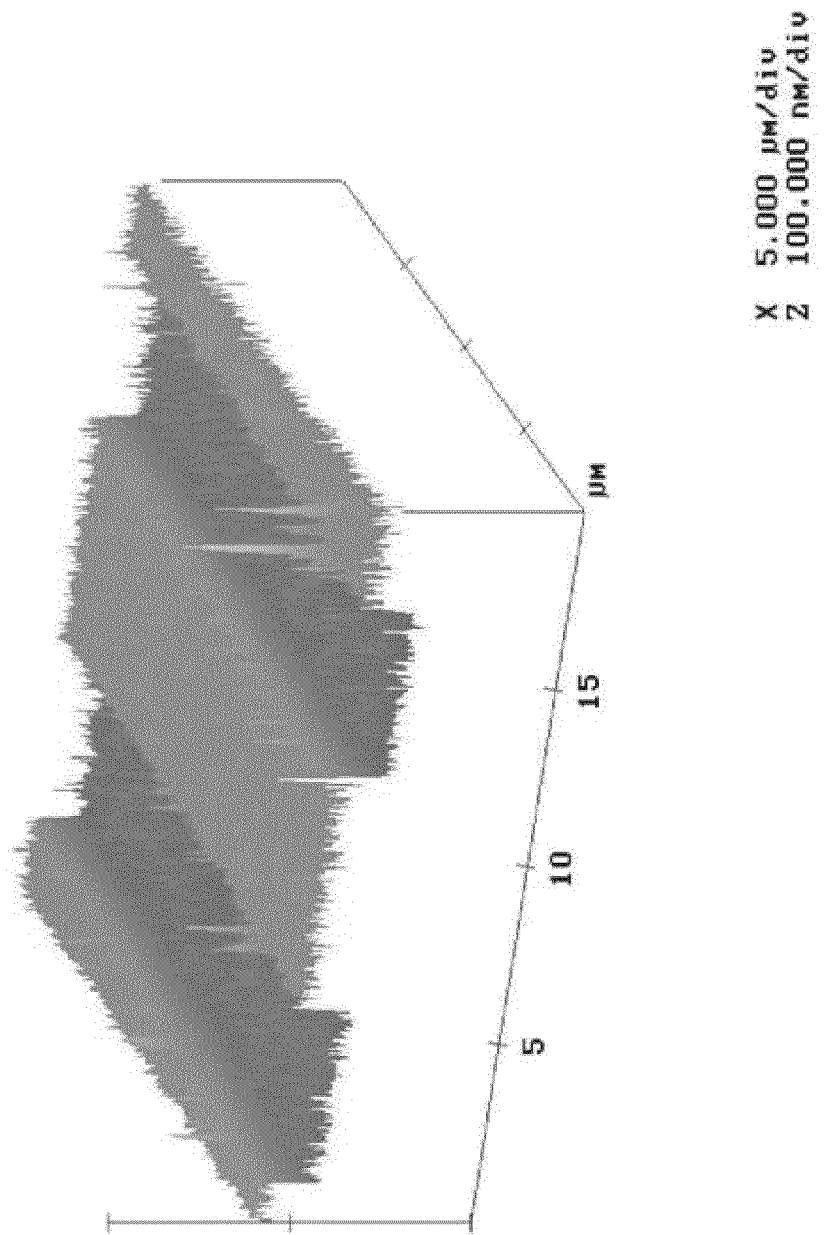
FIG. 7 shows AFM measurement of a pSi thin film after imprinting with a silicon grating patterned stamp.

From work on nano-indentation, it was expected that imprint depth would depend on the pressure applied to the stamp, the hardness of the material being imprinted, and the stamp geometry. FIG. 7 shows and example AFM measurement of a pSi thin film after imprinting with a silicon grating patterned stamp (Λ=10 μm, area=9 mm$^2$).

Figure 8:
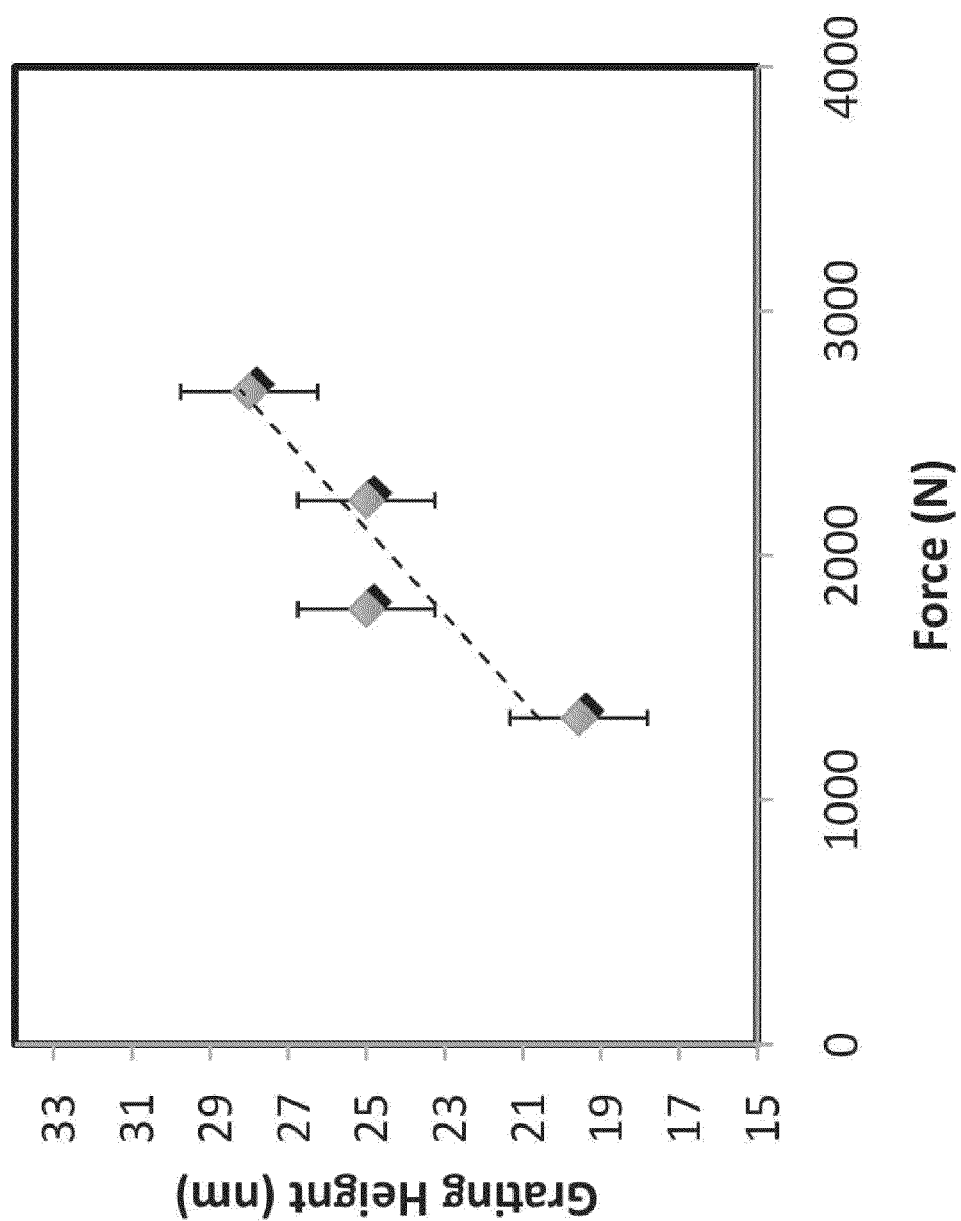
FIG. 8 shows variation of imprint depth as a function of applied force for a 100 nm thick, 80% porosity pSi substrate oxidized in air ambient at 500° C. for 5 minutes.
Figure 10:
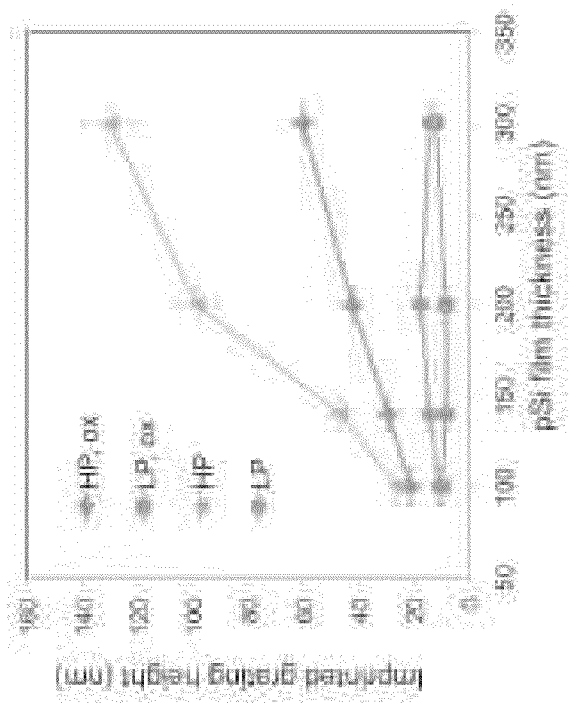
FIG. 10 shows the variation of imprinted grating height for pSi thin films for various film thicknesses and preparation conditions.
Figure 9:
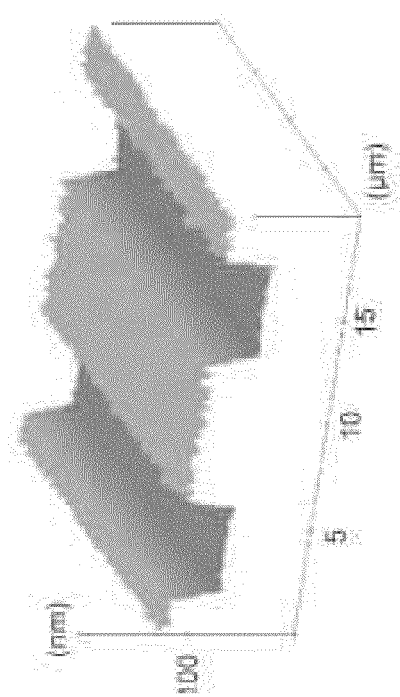
FIG. 9 shows an AFM height image of a typical pSi thin film after performing DIPS.

As shown in FIG. 8, the imprint depth scales with the applied pressure. What is perhaps more interesting is how porous nanomaterial properties, such as porosity, thickness, or subsequent conditioning, for example, oxidation in the case of pSi, affect the imprint depth through variations of material hardness. Atomic force microscopy ("AFM") (see FIG. 9 and FIG. 10) shows that the imprint depth depends in important ways on all of these parameters.

Characterization of DIPS Process to Investigate Porosity, Thickness, and Conditioning Effects These parameters were examined through a standardized DIPS process utilizing a grating patterned stamp (area=9 mm2, Λ=10 μm) applied to porous substrates at a fixed force (~2 kN). By varying the electrochemical preparation conditions as described above, high porosity ("HP") and low porosity ("LP") films i.e., "as-etched" films, were fabricated, estimated at about 80% porosity and about 55% porosity respectively, at a number of different film thicknesses. Duplicate samples were also prepared and treated with oxidation in ambient air at 500° C. for 5 min i.e., "oxidized" films, to examine conditioning effects.

Atomic force microscopy ("AFM") measurements (FIG. 9 and FIG. 10) revealed that oxidized and as-etched LP films exhibited imprint depths that were approximately constant with film thickness, whereas oxidized and as-etched HP films exhibited a trend of increasing imprint depth with increasing film thickness. While not wishing to be bound by a particular theory, the observed variation of imprint depth on HP films may be attributed to changes in effective hardness that arise when the imprint depth is greater than 10% of the film thickness. Thus, the underlying silicon substrate contributes more to the effective hardness of HP pSi as the film thickness is reduced. In other words, thinner HP films have a larger hardness that is manifested in the form of smaller imprint depths, while LP films exhibit a nearly constant hardness because the fractional imprint depth is not greater than 10% of the pSi film thickness. In all cases, oxidized samples imprinted to shallower depths than their un-oxidized counterparts. Though not wishing to be bound by a particular theory, this behavior may be attributed to oxide growth simultaneously reducing porosity and strengthening the interconnected mesoporous network. This behavior can probably be generalized to other porous nanomaterials. Thus, by tuning the applied pressure and the film preparation conditions, very precise, nanometer-scale control over the imprint depth can be achieved.

Figure 11:
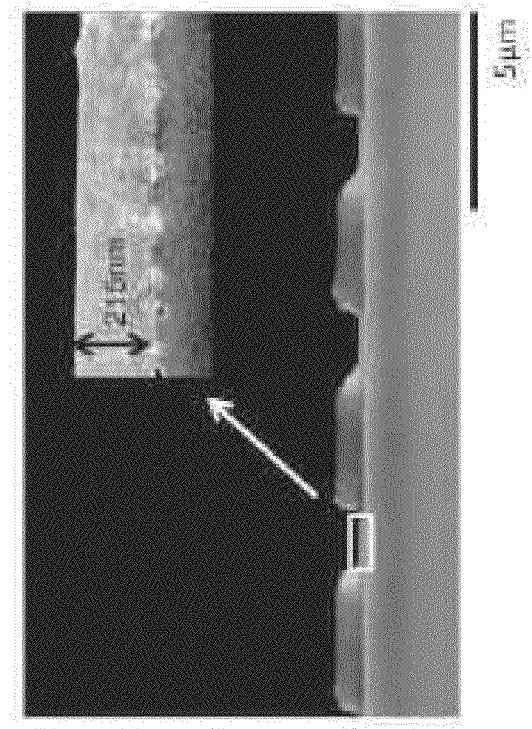
FIG. 11 shows an SEM image of a pSi grating fabricated by imprinting a 1 μm thick HP film to a depth of 785 nm (the inset reveals a crushed pSi film remaining in the imprinted regions).

Imprinting porous structures to a depth that is a significant fraction of the original film thickness was investigated. This is particularly relevant for devices where a large aspect ratio is required. Assuming that volume reduction is accommodated primarily by a compression of the pores and a reduction of the void fraction, then the theoretical limit of the maximum imprintable film fraction should equal the original porosity of the film. This limit was approached by imprinting a 1 μm thick pSi film, with an initial porosity estimated at ~80%, using an increased pressure (approx. 400N/mm2). FIG. 11 shows that the porous silicon grating can be imprinted to a depth of 785 nm, very close to the theoretical limit of 800 nm. In this case the imprinted region no longer resembled the compressed porous structure of FIG. 5, but rather resembled a crushed and densified film of broken silicon crystallites.

Figure 12:
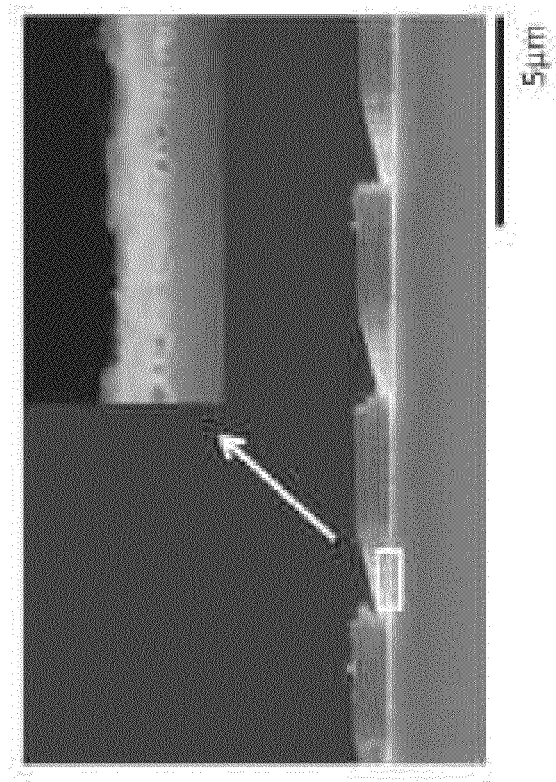
FIG. 12 shows an SEM image of a pSi grating prepared in a similar manner to the pSi grating of FIG. 11, but where the crushed pSi region has been removed.

The broken nature of the crushed film suggests that there no longer exists robust adhesion to the substrate, and indeed, with ultrasonication, the crushed region of pSi can be removed to reveal a "pSi only" grating (FIG. 12). In this manner, imprinted structures can be produced with micro-scale vertical features and aspect ratios that exceed those of the stamp itself.

Imprint Patterns

Figure 13:
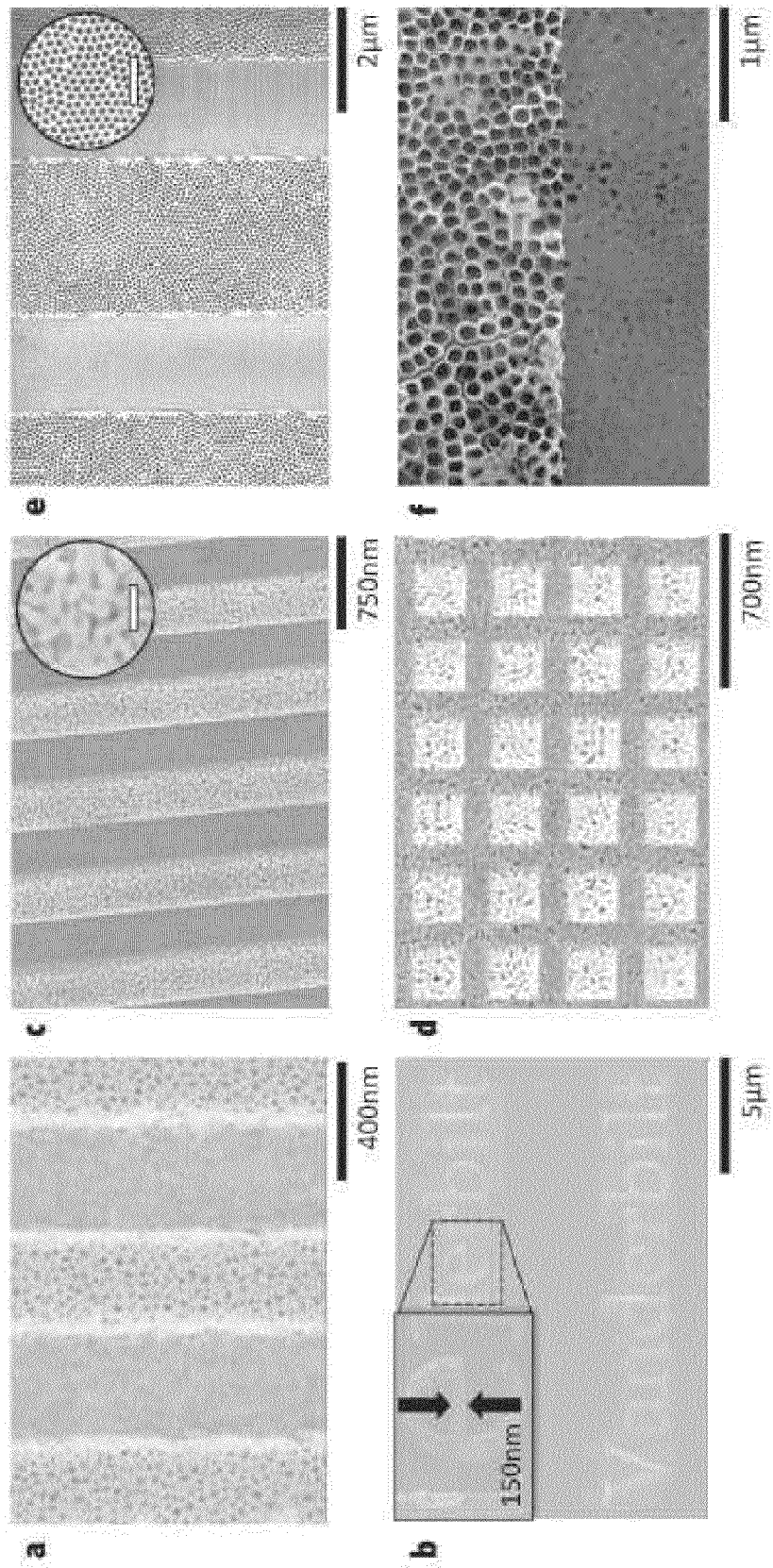
FIG. 13 shows top view scanning electron microscope (SEM) images of porous nanomaterials patterned with DIPS.
Figure 15:
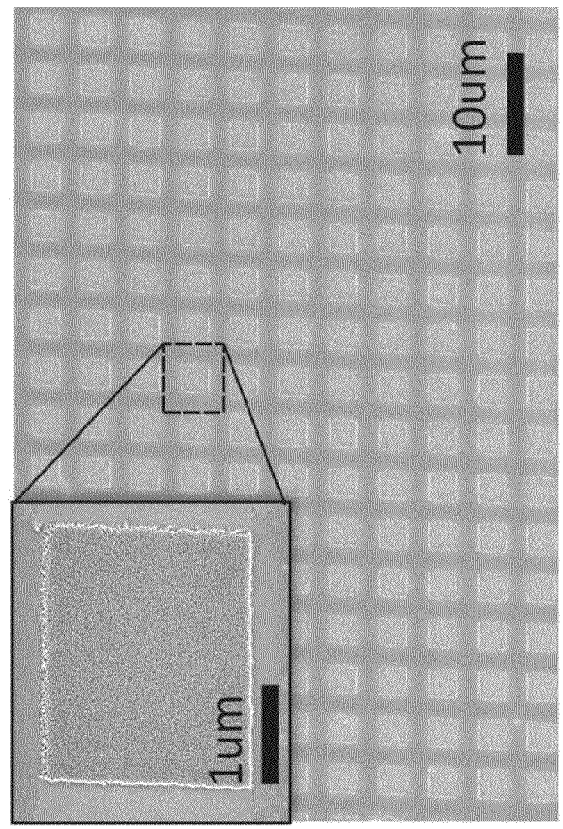
FIG. 15 shows a microscale square array of pSi fabricated by imprinting with a 5 µm period grating, rotating 90 degrees and stamping again.
Figure 14:
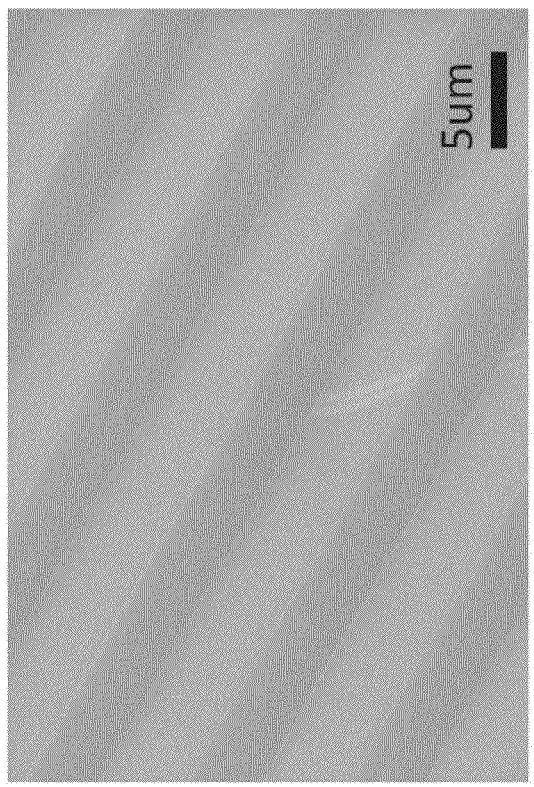
FIG. 14 shows a 10 µm period grating imprinted into ~80% porosity pSi.

FIGS. 13a and 13c show pSi and np-Au, respectively, after performing DIPS with a grating patterned stamp (area=9 mm2, Λ=750 nm), and demonstrate the ability to pattern sub-micrometer features over large areas. In FIG. 13a, the pSi mean pore diameter is approximately 20-30 nm. In FIG. 13c, the inset reveals the original pore morphology (scale bar=100 nm). The observed sidewall roughness is not surprising; indeed, it confirms that the dimension of the pore diameter fundamentally limits the resolution of pattern transfer, as expected. DIPS is capable of patterning sub-wavelength optical structures of arbitrary nanoscale shapes, limited only by this resolution. This is demonstrated with the imprinting of text into pSi (in 3 μm size font) that contains details smaller than 100 nm, as shown in FIG. 13b. FIG. 13b shows pSi imprinted with 3 μm font "Vanderbilt" text. Alternatively, patterns can be easily scaled to produce larger, micron-scale features and patterned arrays in pSi films, as shown in FIGS. 14 and 15.

FIG. 13d shows np-Au square mesh produced by imprinting with a silicon grating (Λ=350 nm), rotating 90 degrees and imprinting again. This demonstrates that 'step and print' structures can be constructed, where a stamp is shifted or rotated multiple times between imprints in order to achieve structures more complex than that of the stamp itself.

Figure 16:
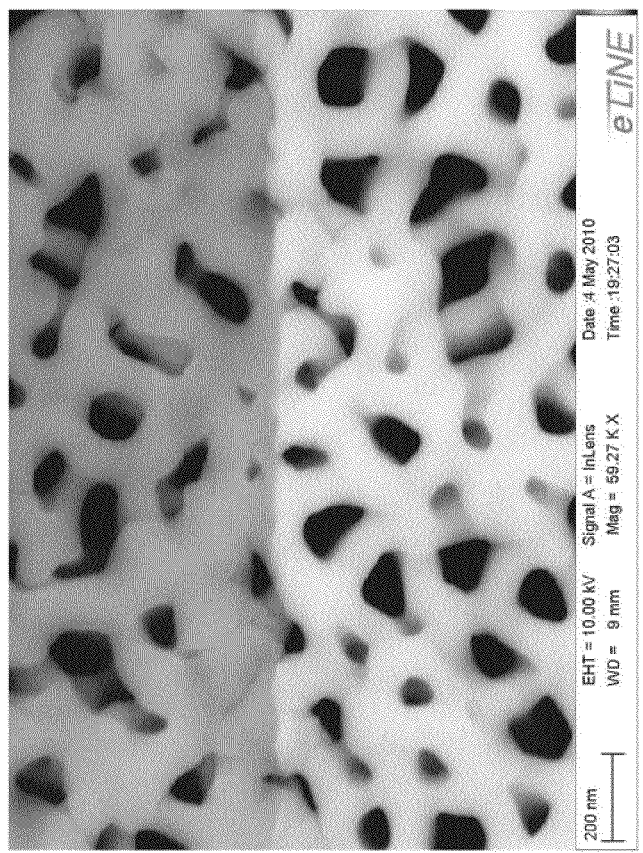
FIG. 16 shows SEM images of imprinted structures on disordered $pAl_2O_3$.
Figure 16:
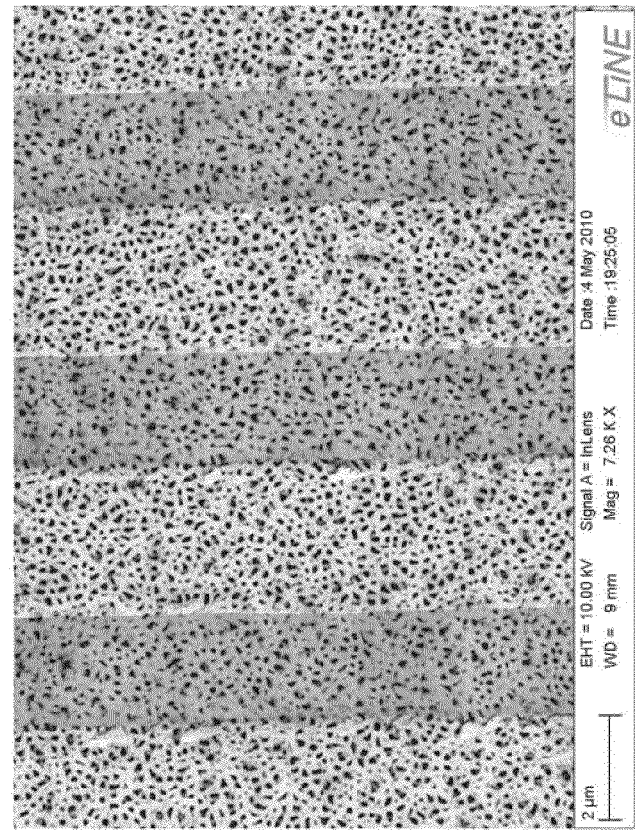

This appears to demonstrate a patterning resolution never before achieved on np-Au. Based on these results, it is expected that DIPS could be employed to realize a new class of low-cost plasmonic devices employing np-Au. DIPS has also been successfully used to imprint hexagonally ordered pAl$_2$O$_3$ (FIG. 13e) as well as disordered pAl$_2$O$_3$ (FIG. 16). FIG. 13e shows an imprinted pAl$_2$O$_3$ grating (Λ=5 μm); the inset reveals the original pore morphology (scale bar=500 nm).

FIG. 16 shows SEM images of imprinted structures on disordered pAl$_2$O$_3$. Disordered pAl$_2$O$_3$ was prepared by following previously reported methods and starting from an ~1 um thick Al film sputtered onto an n-type Si substrate, followed by anodization at 80V in 10% wt phosphoric acid solution, and a short 15 minute pore opening step in 5% wt phosphoric acid solution. Imprinting was performed with a Si grating patterned stamp (Λ=5 μm, area=9 mm$^2$) applied at a force of approximately 4 kN.

Figure 17:
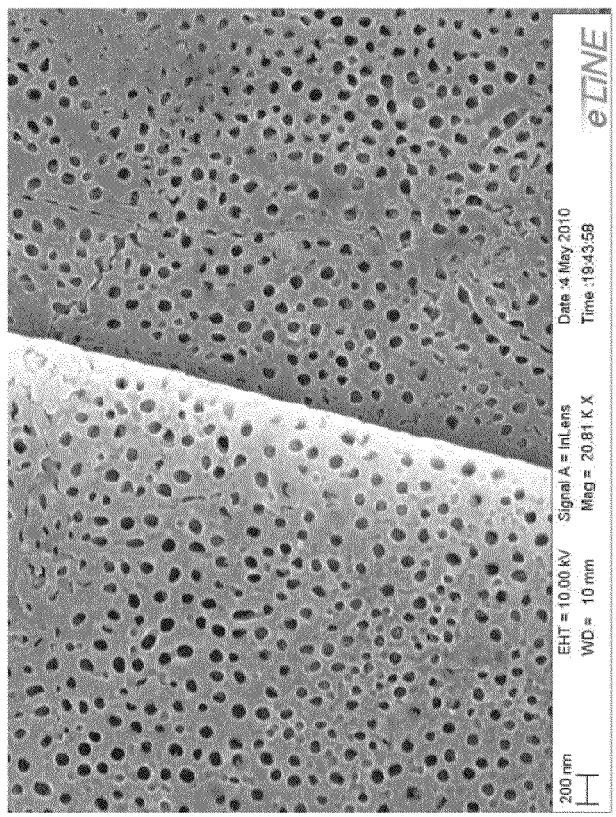
FIG. 17 shows SEM images of imprinted porous TiO2-NTAs imprinted with a silicon grating patterned stamp.
Figure 17:
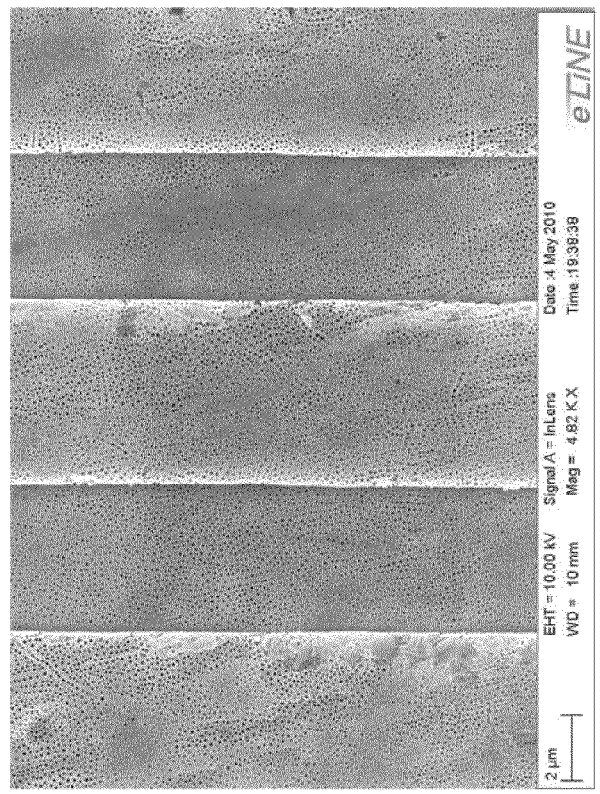

FIG. 13f shows the imprinted and non-imprinted regions of a TiO$_2$-NTA, and reveals results similar to those obtained with other porous nanomaterials (also see FIG. 17). FIG. 17 shows SEM images of imprinted porous TiO$_2$-NTAs imprinted with a silicon grating patterned stamp (Λ=5 μm, area=9 mm$^2$). This sample was prepared by anodization at 65V for 5 hours (as opposed to the 80V sample reported in FIG. 13f). These results indicate that a host of porous materials can be imprinted using DIPS, with excellent pattern reproduction and large area uniformity.

Devices Constructed Using DIPS

Figure 18:
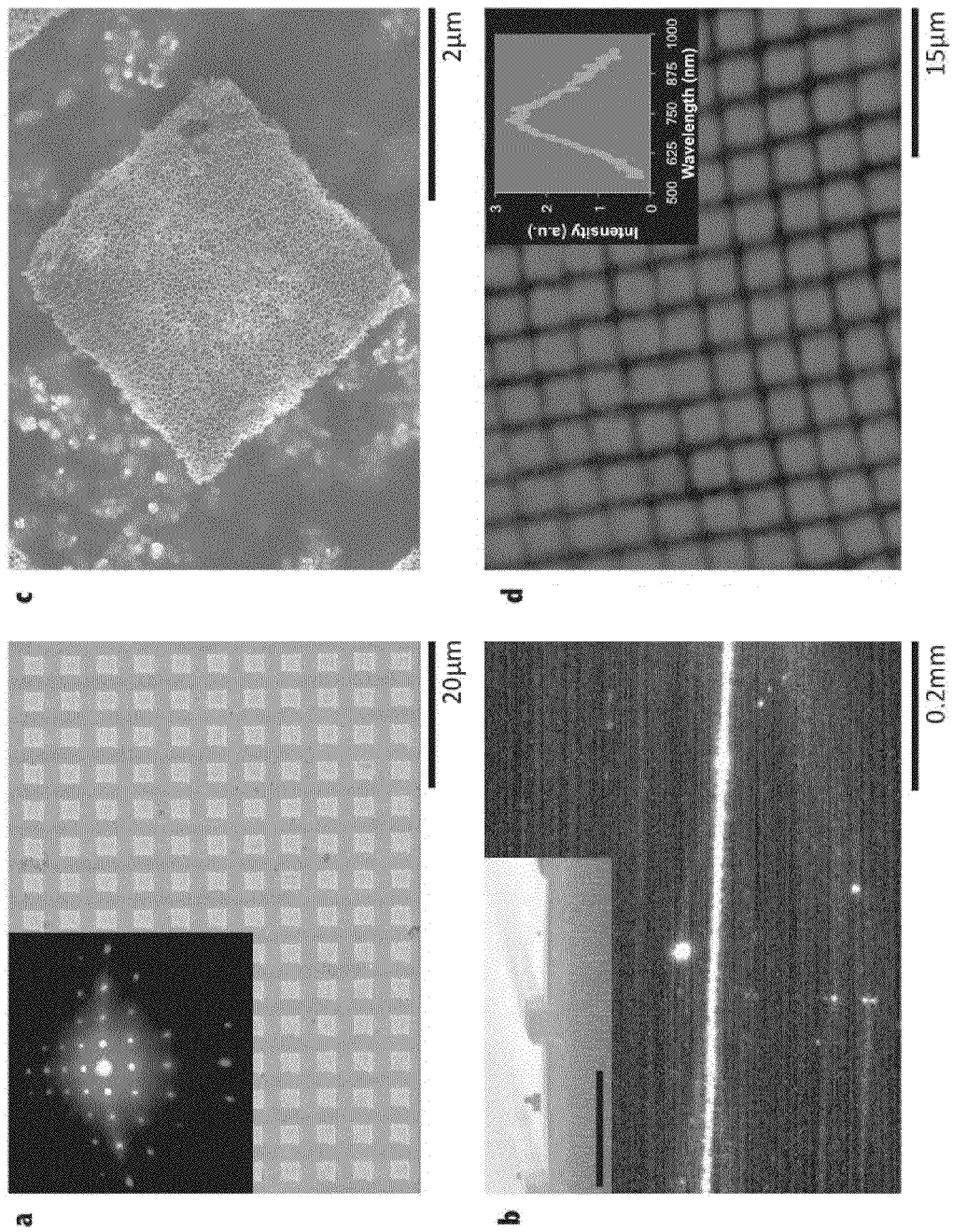
FIG. 18 shows selected device structures fabricated by DIPS.

To suggest the variety of devices that could be constructed using DIPS, several sample structures have been fabricated (FIG. 18). As shown in FIG. 18a, appropriately patterned DIPS structures can be readily used as optical diffraction gratings. FIG. 18a shows an SEM image of a np-Au square diffraction grating (Λ=5 μm), produced in the same manner as in FIG. 5 d. The inset reveals the optical diffraction pattern (Λ=647 nm) at approximately 15° from normal incidence. FIG. 18a reveals a square diffraction grating fabricated on np-Au on a glass substrate. A clear and distinct diffraction pattern appears due to the large spatial uniformity of the imprinted micro-scale pattern.

The fabrication of diffraction gratings in porous materials is particularly relevant to sensing applications, where the presence of analytes in the porous matrix modifies the effective refractive index of the grating, leading to significant changes in the diffraction signature. This phenomenon has been demonstrated for label-free sensing of small molecules. Porous diffraction gratings could also be utilized to couple light into dielectric waveguides (as in FIG. 6) or to launch surface plasmons in metallic films. Furthermore, grating structures are of particular interest in photovoltaic applications, owing to their ability to couple light into guided mode of thin-film devices for light harvesting.

As a second example, 3D waveguides were fabricated (FIG. 18b) utilizing DIPS on pSi in a multistep process similar to that previously described for the grating coupled 2D waveguide (FIG. 6). FIG. 18b shows a camera image (top view) of a DIPS patterned pSi structure waveguiding near-infrared light (the inset reveals a waveguide SEM cross-section, scale bar is 1 μm). Horizontal confinement of light (coplanar direction) was achieved by imprinting trenches into an about 450 nm thickness medium porosity (about 67%) pSi film prepared at a current density of 20 mA cm-2. Subsequent etching of a 1.8 μm thick high porosity (about 80%) pSi cladding layer (80 mA cm-2) produced the vertical confinement required for waveguiding. An interesting advantage of utilizing photonic structures constructed from porous nanomaterials is the ability to infiltrate various species into the porous network that can then be used in switching, sensing, or light emission applications.

FIGS. 18c and 18d, show freestanding pSi microparticles fabricated using DIPS. FIG. 18c shows an SEM image of a free standing square pSi microparticle. FIG. 18d shows a confocal fluorescence micrograph of freestanding pSi microparticles on carbon tape (inset shows the photoluminescence spectra of an as-anodized pSi film, excitation λ=488 nm). The fabrication follows a procedure similar to that described above (FIG. 13d), with some important modifications. When a stamp is imprinted all the way into pSi, with the entire stamp surface brought into contact with the substrate, a new and interesting stamping regime occurs. This stamping regime is referred to as "overstamping," to distinguish it from the previous examples presented.

Figure 19:
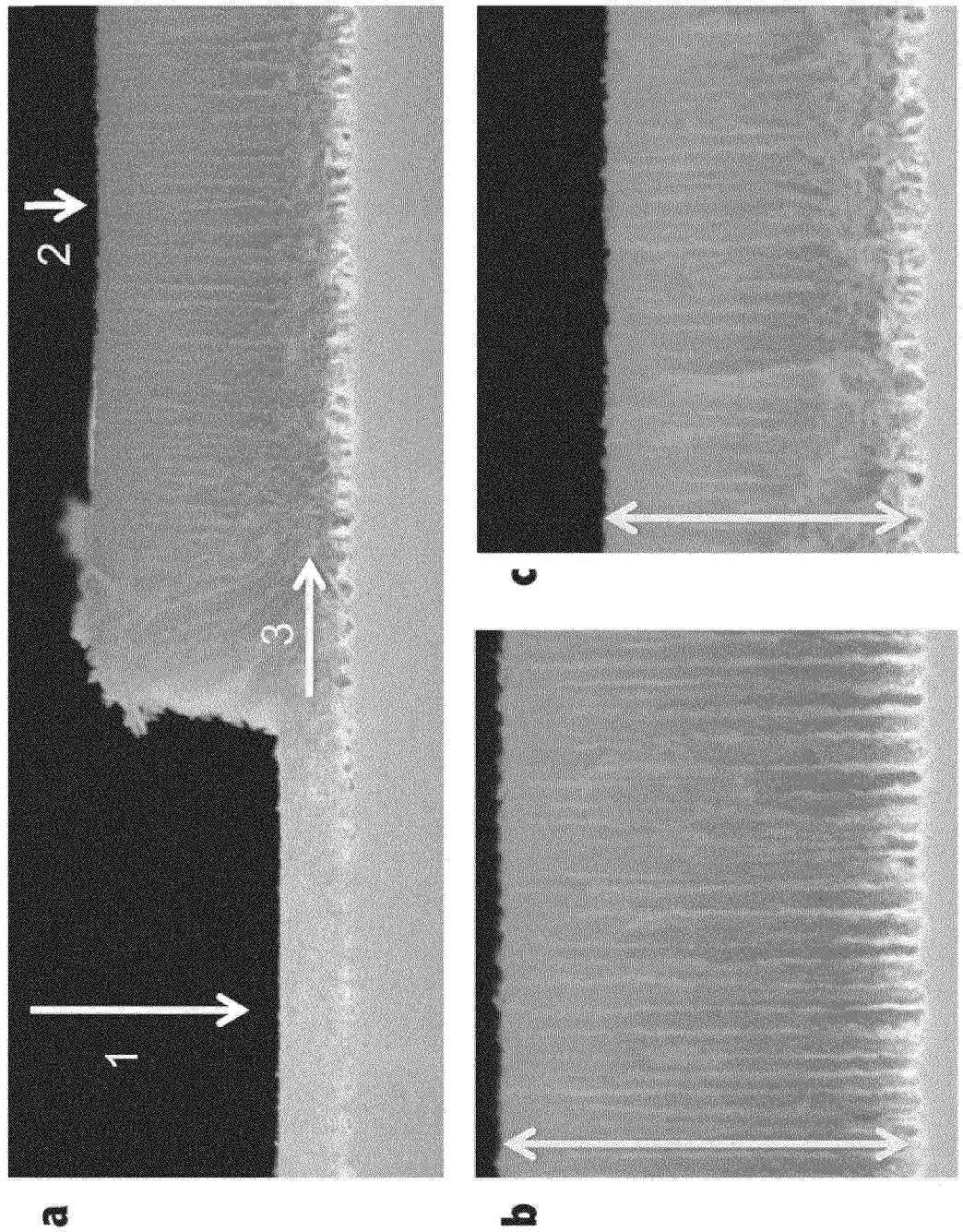
FIG. 19 shows SEM images depicting the "overstamping" regime on pSi.

Overstamping affords the important ability to selectively weaken the base of the porous nanostructure, as shown in FIG. 19. FIG. 19 shows SEM images depicting the "overstamping" regime on pSi. FIG. 19(a) shows imprinting in the overstamping regime requires that the stamp makes contact and applies a pressure in regions 1 & 2. As a result of extreme densification and vertical compression in region 1, some horizontal expansion occurs through region 3, leading to weakening and collapsing of the pore bottoms as they are compressed in region 2. FIG. 19(b) shows the original 1 μm thick 80% porosity film, and FIG. 19(c) shows the overstamped pSi film with a selectively weakened bottom interface.

Figure 20:
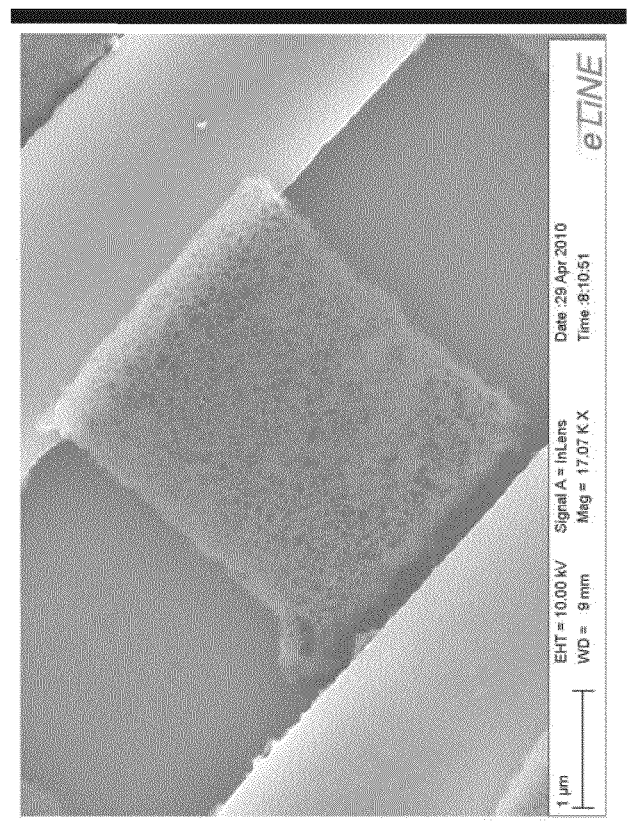
FIG. 20 shows SEM images of freestanding pSi microparticles on the SI stamp used to pattern them.
Figure 20:
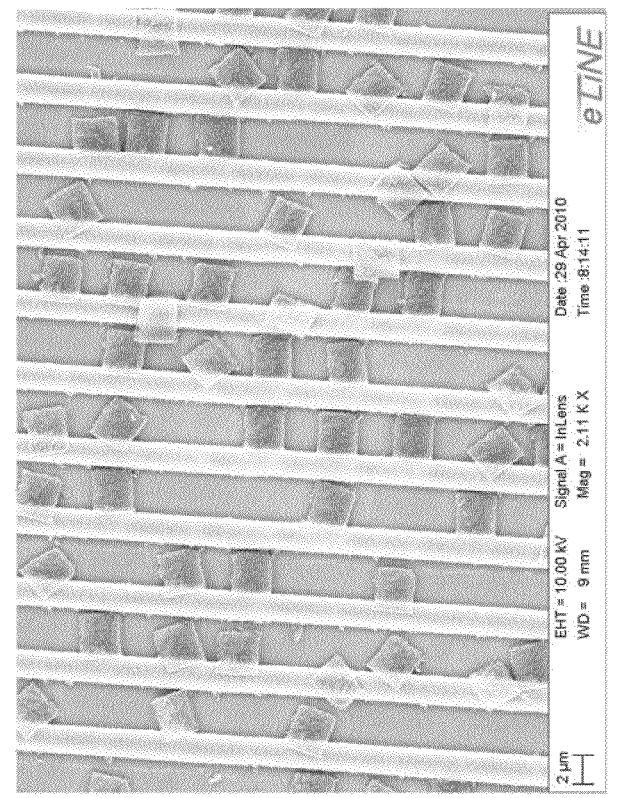

As a result of overstamping, patterned structures can be easily detached from the substrate. This can be done by using the combination of frictional and electrostatic forces that exist between the stamp and the imprinted structure, as shown in FIG. 20. FIG. 20 shows SEM images of freestanding pSi microparticles on the Si stamp used to pattern them. After an initial stamping with a silicon grating (Λ=5 μm, area=9 mm$^2$) on a 1 μm thick 80% porosity pSi film, the stamp was rotated 90 degrees and imprinted again with a force of approximately 3 kN. As a result of overstamping weakening the bottom interface of the pores, some particles were removed by the frictional and electrostatic forces that exist between the pSi and the Si stamp.

Alternatively, patterned structures can be easily detached from the substrate by performing ultrasonication in an aqueous solution, or by simply applying and removing an adhesive such as carbon tape (FIGS. 18c and 18d). These pSi microparticles exhibit excellent size uniformity, and can be readily placed in solution. Other particle geometries could also be realized, on both the micro- and nanoscale, by simply changing the geometry of the applied stamp. Selected particles can exhibit highly desirable traits for use in vivo that include, for example, efficient loading of therapeutics or imaging contrast agents, distinctive photoluminescence or other signatures, and biodegradability.

FIG. 18d further demonstrates that these pSi microparticles maintain their intrinsic photoluminescence properties. In addition to particular interest for in vivo applications, the design of isolated porous particles is also of growing interest for Si-based Li-ion battery anodes, which are particularly attractive for their large specific capacity, low volume, light weight, and potentially low cost.

In summary, DIPS offers an exciting and straightforward approach for realizing a large variety of important device structures based on a wide class of porous nanomaterials. The process enables the fabrication of micro- and nanometer scale porous structures with an unprecedented combination of fast throughput, low cost, and high resolution. As a result, DIPS enhances both the commercialization potential and accessibility of nanostructured materials and devices.

The use of DIPS has been demonstrated on both dielectric and metallic porous materials, in 2D and 3D geometries, and for the fabrication of microparticles. DIPS circumvents the need for lithography, or masking materials and etch chemistries, that form the usual paradigms for the fabrication of structures from porous media. Thus it may open a new class of low-cost technologies involving this important class of materials.

Example 2

Grating Fabrication

Figure 21:
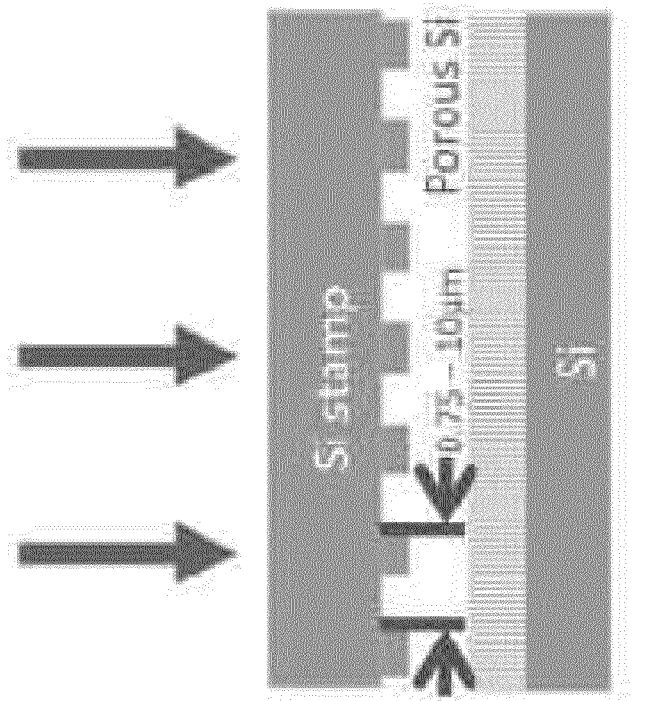
FIG. 21 shows an illustration of the stamping process performed on porous silicon with the use of reusable silicon stamps.
Figure 21:
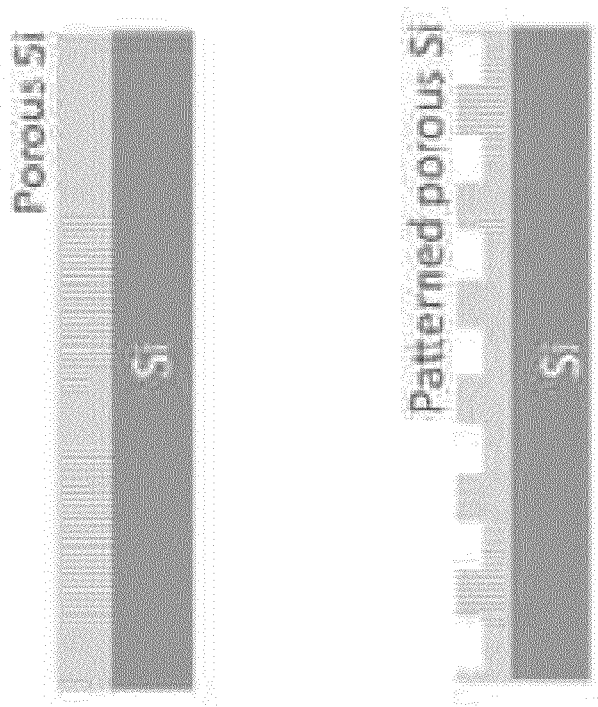

The stamping process applied to porous silicon is shown in FIG. 21. Referring to FIG. 21, first, a porous silicon thin film is prepared from a silicon substrate by electrochemical etching. Next the silicon stamp, prepared by standard lithographic methods, is applied to the porous silicon substrate. Upon removal of the stamp, a patterned porous silicon structure is revealed. No heating, curing, or intermediary coating layer is required. The silicon stamps are reusable and do not wear significantly over time. Furthermore, the patterning process is very rapid as stamping only takes a matter of seconds to be performed.

A variety of stamp patterns and porous silicon substrates were fabricated. Porous silicon single layers were prepared from p-type Si (100) wafers (0.01-0.02 Ω-cm). Samples were anodized in an electrochemical cell in 15% ethanolic hydrofluoric acid. Current densities of 5 mA/cm2 and 80 mA/cm2 were applied to produce films of ≈55% and ≈80% porosity, respectively. Etching times between 2.5-60 seconds were used, depending on the applied current density, to prepare films thicknesses in the 100-300 nm range.

Reusable microscale silicon test patterns and grating stamps were fabricated via photolithography and reactive ion etching. Submicron silicon grating stamps were fabricated via electron beam lithography. Each silicon-grating stamp consisted of a large area (9 mm$^2$) diffraction grating with a height of approximately 500 nm. Grating pitches from 750 nm to 10 μm were produced. Preliminary test patterns were demonstrated by contacting the stamp and substrate using a simple vise grip.

Stamping of large area (9 mm$^2$) patterns was performed using a Tinius Olsen hydraulic tester with a computer-controlled load in the 1 kN-3 kN range. Use of the hydraulic tester insured accurate knowledge of the applied load and uniform application. A calibrated vise-grip or similar tool can also work well in this process.

Imprinting Characterization

I. Test Patterns, 10 µm+

A variety of micron-scale test patterns, with feature sizes in the 10-100 µm range were imprinted into porous silicon thin films. These preliminary imprints were examined by optical microscopy and revealed excellent pattern transfer quality. A variety of pattern shapes were tested to demonstrate proof-of-concept imprinting into porous silicon.

Figure 22:
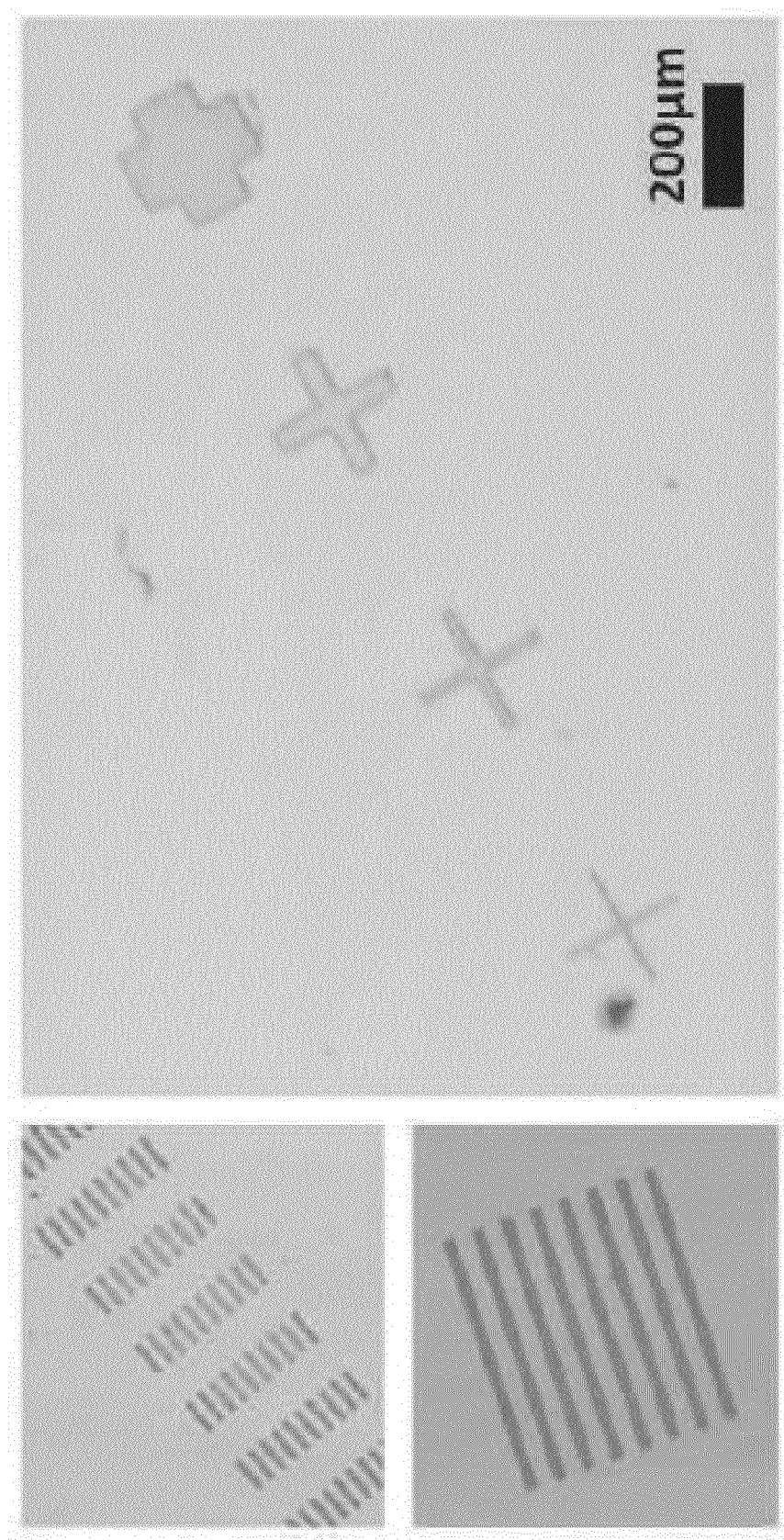
FIG. 22 shows micrographs revealing large size (>10 µm) test patterns imprinted into porous silicon.

FIG. 22 shows the successful imprinting of porous silicon for a variety of test patterns including square and rectangular grating sections as well as crosses. This demonstration reveals qualitatively that large-scale patterns can be readily imprinted into porous silicon using nothing more than a silicon stamp and a vise grip.

II. Grating Patterns, 5-10 µm

Large-area (9 mm$^2$) silicon grating stamps with 5-10 µm pitches were stamped into porous silicon thin films to produce porous grating structures. Immediately after stamping, the uniformity of the imprinted pattern could be inspected visually. Translating a laser spot around the grating surface revealed consistent diffraction intensity, indicating a highly uniform pattern transfer. See FIG. 4. The high uniformity of the imprint over a large area suggests that even larger patterns, potentially up to a full wafer scale, could be transferred to porous substrates.

Figure 23:
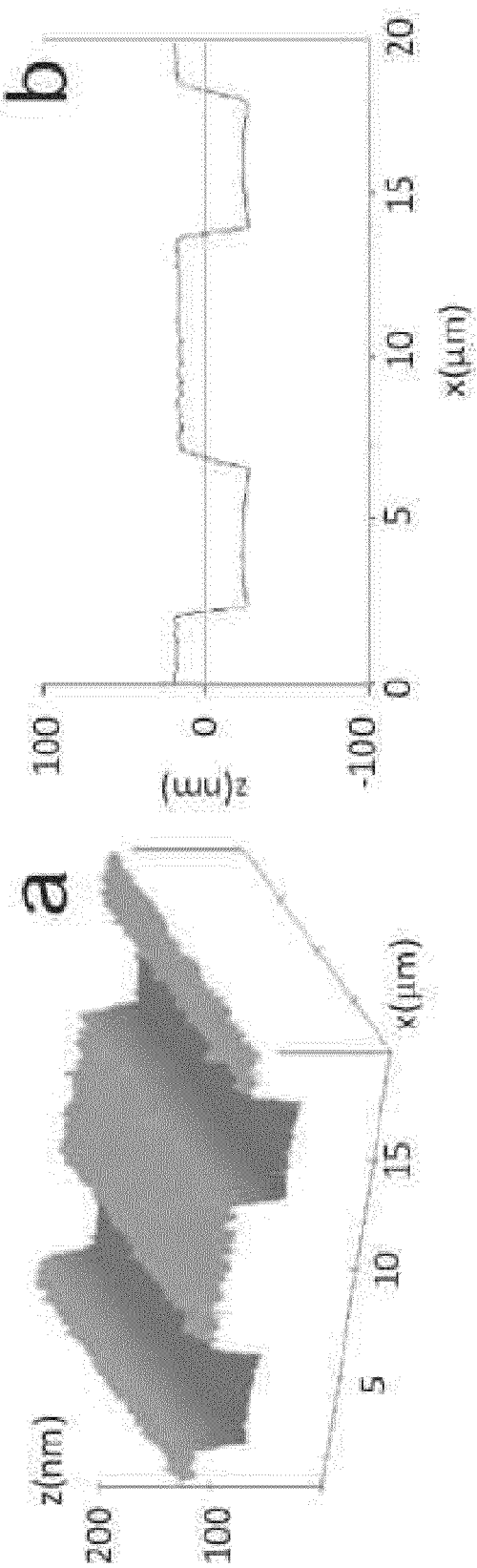
FIG. 23 shows AFM measurements showing (a) three-dimensional pattern profile and (b) cross-section profile for an imprinted 80% porosity pSi film.

AFM measurements confirmed a high degree of imprint uniformity, as grating heights varied no more than a few nanometers over the extent of the imprint. FIG. 23 shows a typical AFM profile for an imprinted porous silicon grating. In this example, the grating height is 40 nm and the pitch is 10 µm. Measurements reveal an air fraction of approximately 0.43, perfectly complementing the 0.57 air fraction determined for the silicon stamp. Importantly, we note that the nature of AFM measurements makes it difficult to obtain good tracking along the steep slope of the sidewalls. Thus, we note that the sidewalls are likely steeper and sharper than they appear in the AFM profile.

The root-mean-square surface ("RMS") roughness of imprinted porous silicon samples was characterized using AFM. Measurements of unstamped regions of porous silicon (i.e., FIG. 23b, 7.5-13 µm) revealed a ≈4 nm (rms) roughness. This roughness is typical of a porous silicon surface. However, the stamped regions of porous silicon exhibited a lower ≈1.5 nm (rms) roughness. Tough not wishing to be bound by a particular theory, this lower roughness value is probably indicative of crushing and flattening of the porous mesostructure. However, as stamping proceeds to densify the porous layer we are concerned with the prospect that the pores may become blocked. This result would then hinder the infiltration of materials into the porous network. In sensing applications for example, this could reduce the amount of analyte that could be incorporated into the pores and adversely affect the performance of the device. However, to this point we have not observed any conclusive evidence confirming or refuting pore occlusion.

III. Submicron Grating Patterns

Figure 24:
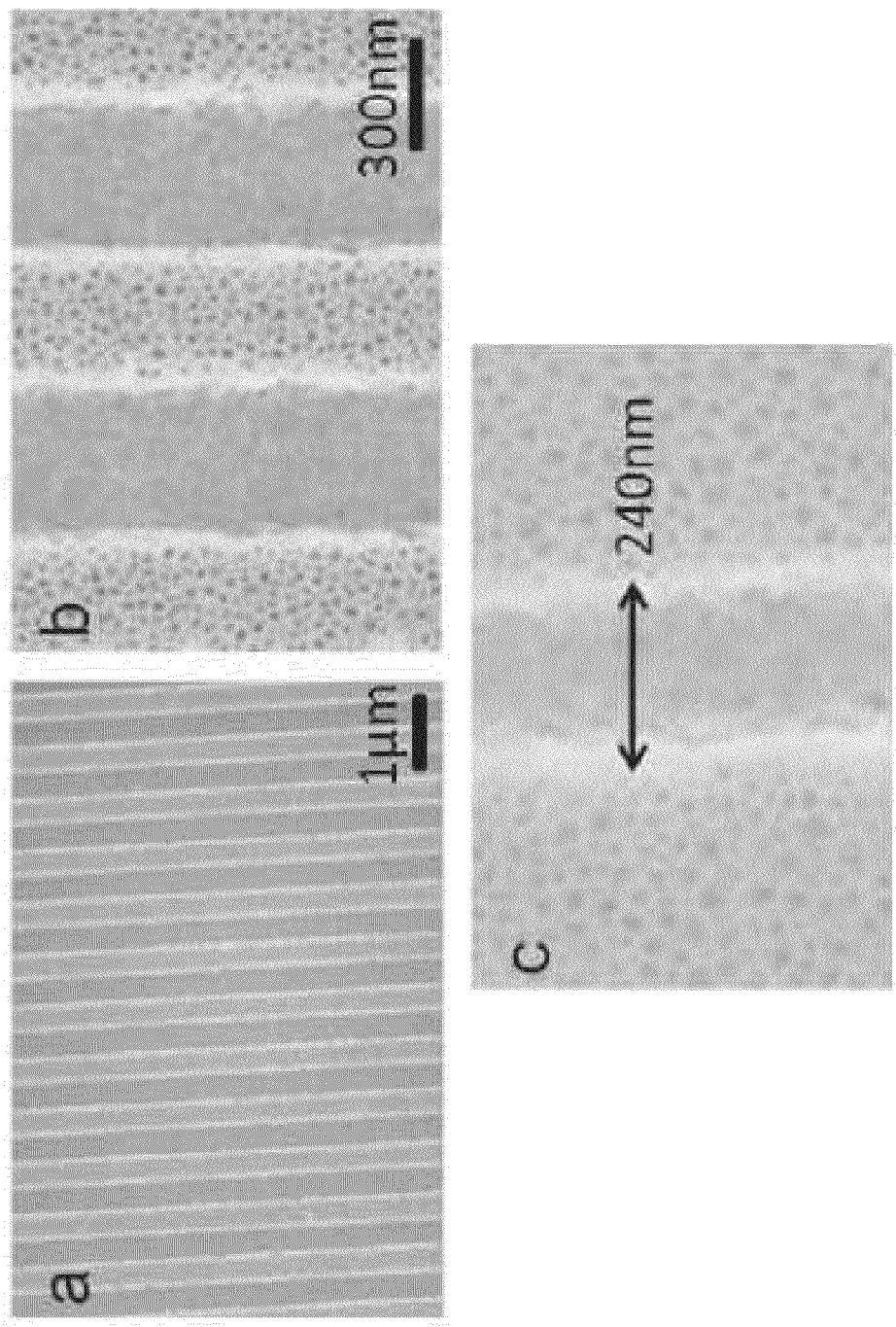
FIG. 24 shows SEM images showing imprinted porous gratings stamped with a 750 nm pitch silicon grating with (a, b) ≈55% duty cycle, and (c) ≈30% duty cycle.

Silicon grating stamps with a 750 nm pitch were imprinted into porous silicon films in order to investigate the potential for imprinting sub-micron sized features. As shown in FIG. 24, imprinting of the original submicron pattern is successfully demonstrated. The imprinted feature size was varied by simply tuning the duty cycle of the silicon grating stamp. For a ≈30% duty cycle silicon grating stamp, we observe quality patterning for features sizes down to 240 nm. These results suggest that even smaller feature sizes, potentially below 100 nm could be demonstrated.

The SEM images shown in FIG. 24 show the true porous nature of the imprinted gratings. The pores have an average diameter of 20-30 nm. As a natural result of the stamping process, we expect a minimum sidewall roughness on the order of the average pore size. Indeed, this is what we observed. We expect that this roughness could be reduced by simple chemical treatment such as light oxidation followed by an HF dip. Minimizing the sidewall roughness would be important for enabling porous silicon waveguide structures to be employed with minimal optical losses. The SEM images further reveal very sharp sidewalls, confirming visually what could not be distinguished by AFM.

IV. Varying Imprint Depth

In order to precisely control the overall geometry of imprinted structures, it is important to investigate the tuning of vertical features. Thus, we performed experiments with the goal of obtaining fine control over the imprint depth. We report two separate approaches for controlling the imprint depth: (1) varying the applied force and (2) varying the substrate parameters.

Figure 25:
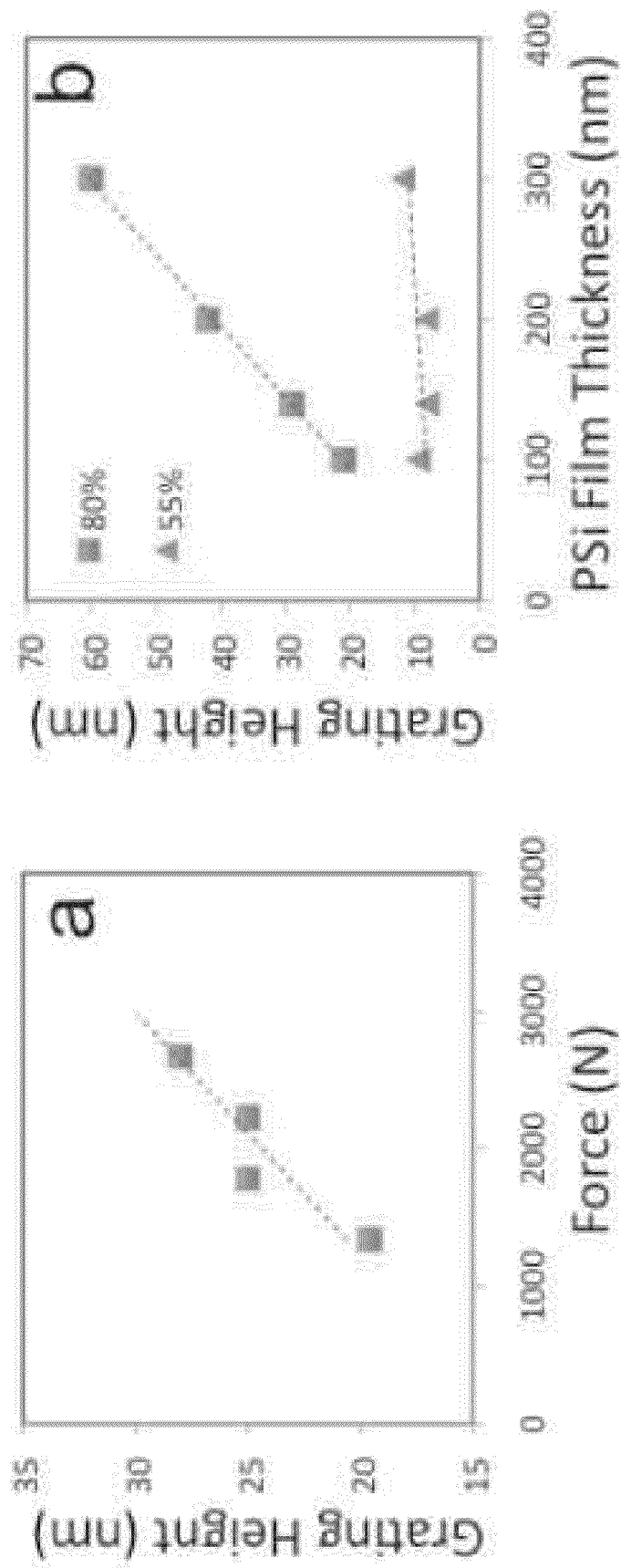
FIG. 25 shows varying the imprint depth of a large area (9 mm$^2$) 10 µm pitch grating by (a) varying the applied force for a 100 nm thick 80% porosity film, and (b) varying the PSi film porosity and thickness for an applied force of 2 kN.

The most immediately apparent method for stamping deeper into a material is to simply apply more force. FIG. 25a shows the results for varying the applied force on a 10 µm pitch silicon grating stamped into a 100 nm thick 80% porosity porous silicon film. The trend shows that it is indeed possible to fine-tune the imprint depth by adjusting the applied force as we readily obtain imprint depths between 20-30 nm by varying the applied force between 1-3 kN. For this particular substrate and stamp size, going to much larger grating heights, for example beyond 60 nm, would require a force of at least 10 kN to be applied. For waveguides or any optical devices with a small footprint, obtaining this deep of an imprint should not be an issue, as it will require significantly less force to obtain the same applied pressure.

However, if we need to obtain a deep imprint for a specific large footprint application, such as a grating, then we should consider an alternative approach that does not require upwards of 10 kN. FIG. 25b presents an alternative method for varying the porous grating imprint depth, by means of varying the substrate parameters. The data reveals a range of imprint depths obtained for a fixed applied force of 2 kN. Two different imprinting regimes are apparent depending on the porous silicon film porosity. In the first regime, corresponding to 80% porosity porous silicon thin films, we observe increasing imprint depth with increasing film thickness. This trend occurs because the hardness of high-porosity p+ PSi decreases with increasing film thickness. Changes in hardness arise due to the influence of the underlying silicon substrate. In general, when imprinting to a depth h>d/10 where d is the film thickness, the influence of the underlying substrate cannot be ignored. In this regime, an effective hardness must be computed. Thus, as d approaches zero, the film hardness increases to approach that of bulk silicon. This regime however does not apply to 55% porosity porous silicon, under these testing conditions, because the imprint depth h is not greater than d/10. Thus, the applied stamp encounters a consistent material hardness regardless of the film thickness.

Example 3

Diffraction Based Sensor Exposed to Water Vapor

Figure 26:
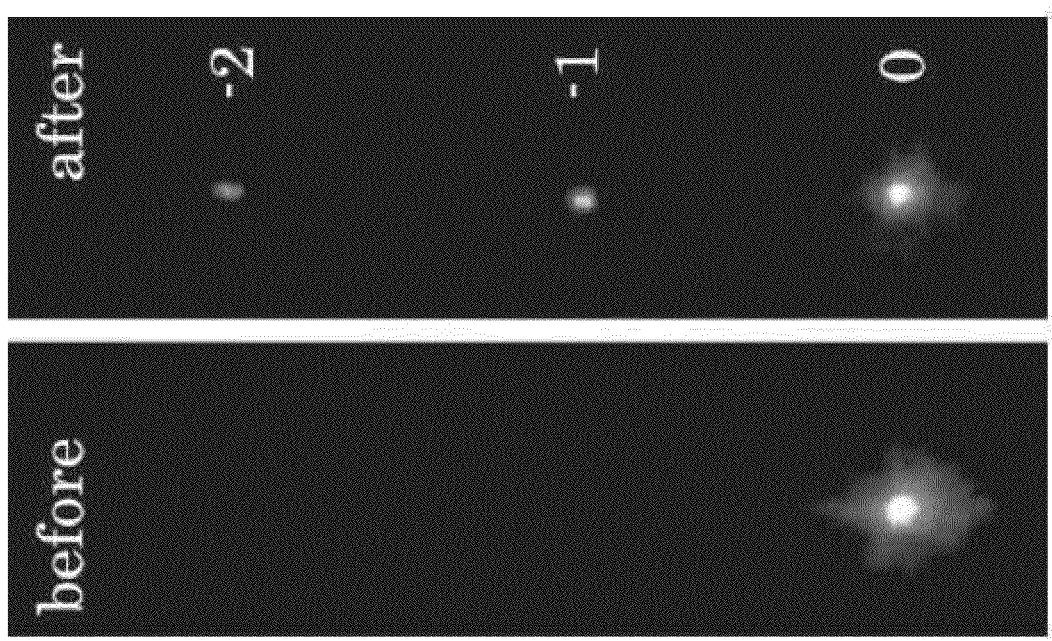
FIG. 26 shows a diffraction pattern from a sensor of the invention before and after water vapor is introduced to the diffraction grating of the sensor.

As a proof of concept, the grating of a sensor similar to FIG. 4 was dried and then exposed to water vapor. Photographs of the changing diffraction patterns are shown in FIG. 26. Before applying water vapor to the sample surface, diffraction is too weak to be observed with the camera (FIG. 26 before). Once water vapor is applied to the sample, it condenses inside the pores and produces a large increase in the effective refractive index of the grating due to water ($n_{water} \approx 1.33$) displacing air ($n_{air} \approx 1$). This increase in refractive index results in a large increase in the diffraction efficiency and the visible appearance of diffracted orders (FIG. 26 after). Within a few seconds after water vapor condensation, the water evaporates from the sample and the initial diffraction intensities are restored. The same water vapor experiment was also performed on a nonporous silicon diffraction grating of the same dimensions (not shown), however, no increase in diffraction efficiency is observed.

Example 4

Comparison of Diffraction Based Sensors with and without Porous Materials

The sensitivity of a traditional diffraction-based sensor (DBS) with that of a porous silicon diffraction-based sensor (PSi-DBS) was compared. In a traditional DBS, an increase δh of the grating height occurs when an analyte is adsorbed onto the grating surface. This gives rise to a change of the grating diffraction efficiency. When the grating height is smaller than the wavelength and δh is much smaller than the original grating height, η scales linearly with h, which is proportional to the number of analyte molecules adsorbed on the grating surface; the slope of the curve is the device sensitivity.

A PSi-DBS, however, is composed of a thicker grating realized on a silicon substrate. Once functionalized, the PSi surface is also able to immobilize a specific analyte, it if the analyte is sufficiently small it will infiltrate the grating. While the overall physical thickness remains almost unchanged on a percentage basis, analyte infiltration leads to a marked change in the effective refractive index of the PSi, and thus to a change in the optical thickness of the grating. A change of the diffraction efficiency again arises, which here is linear in the analyte fraction $f_{analyte}$ in the PSi.

Figure 27:
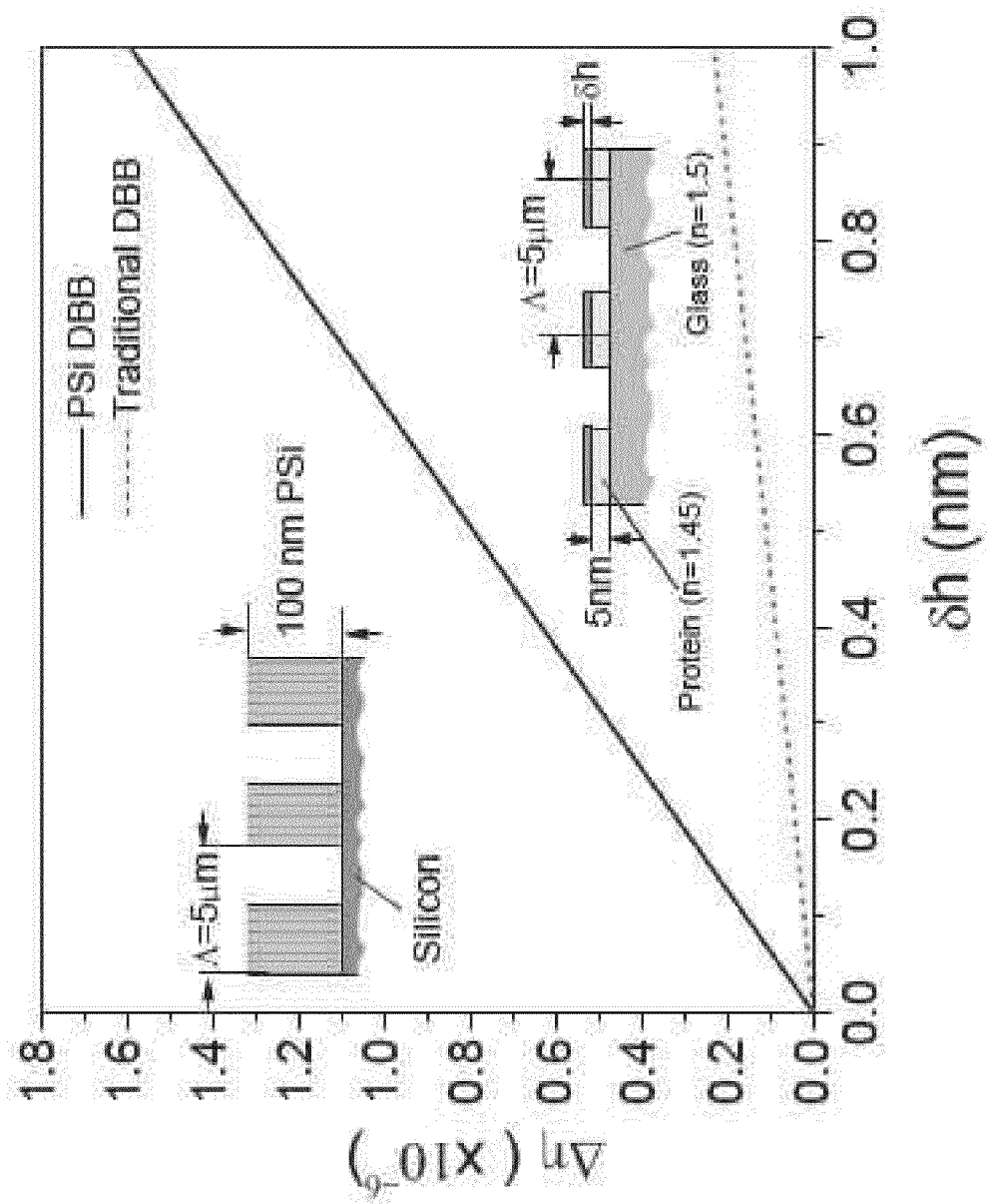
FIG. 27 shows a calculated diffraction efficiency variation $\Delta\eta$ for a traditional diffraction based biosensor and a porous silicon diffraction grating-based sensor as a function of the change of the grating thickness $\delta h$. The incident beam wavelength is =1550 nm, and the angle of incidence is =20 degrees.

In order to compare the two systems we need to assume equal amounts of analyte present in the different sensors. For two sensors with the same grating area, it is easy to show that we should simply put $f_{analyte}$=h/D, where D is the PSi grating height. In FIG. 27 the calculated diffraction efficiency variation is plotted for a traditional DBS with a protein grating (n=1.45) of height h=5 nm and period=5 m on a glass substrate (n=1.5), and for a PSi-DBS with low-porosity (p=0.61) grating of thickness D=100 nm on a silicon substrate, both as a function of h in the traditional DBS, where fanalyte=h/D in the PSi-DBS. The calculations show an increase of the sensitivity of about 8 times, without any optimization of the PSi structure.

In addition to the sensitivity enhancement, which is essentially due to the use of a higher original grating, the surface available for protein binding in the PSi-DBS sensor is much larger than in the traditional DBS sensor, thus the promptness of the detector may be enhanced as well as its sensitivity.

Example 5

Sensor Comprising a Porous Silicon Waveguide Grating

The PSi waveguide consists of two porous silicon films: There is a top, low-porosity p=0.61 (high refractive index) layer with height $d_{core}$=340 nm, and a bottom, high-porosity p=0.87 (low refractive index) layer with $d_{clad}$=1500 nm. A ZEP 520A (nZEP1.54) grating coupler with thickness h380 nm, air fraction f0.582 and period 1590 nm is fabricated using electron beam lithography. See FIG. 28 a).

Figure 28:
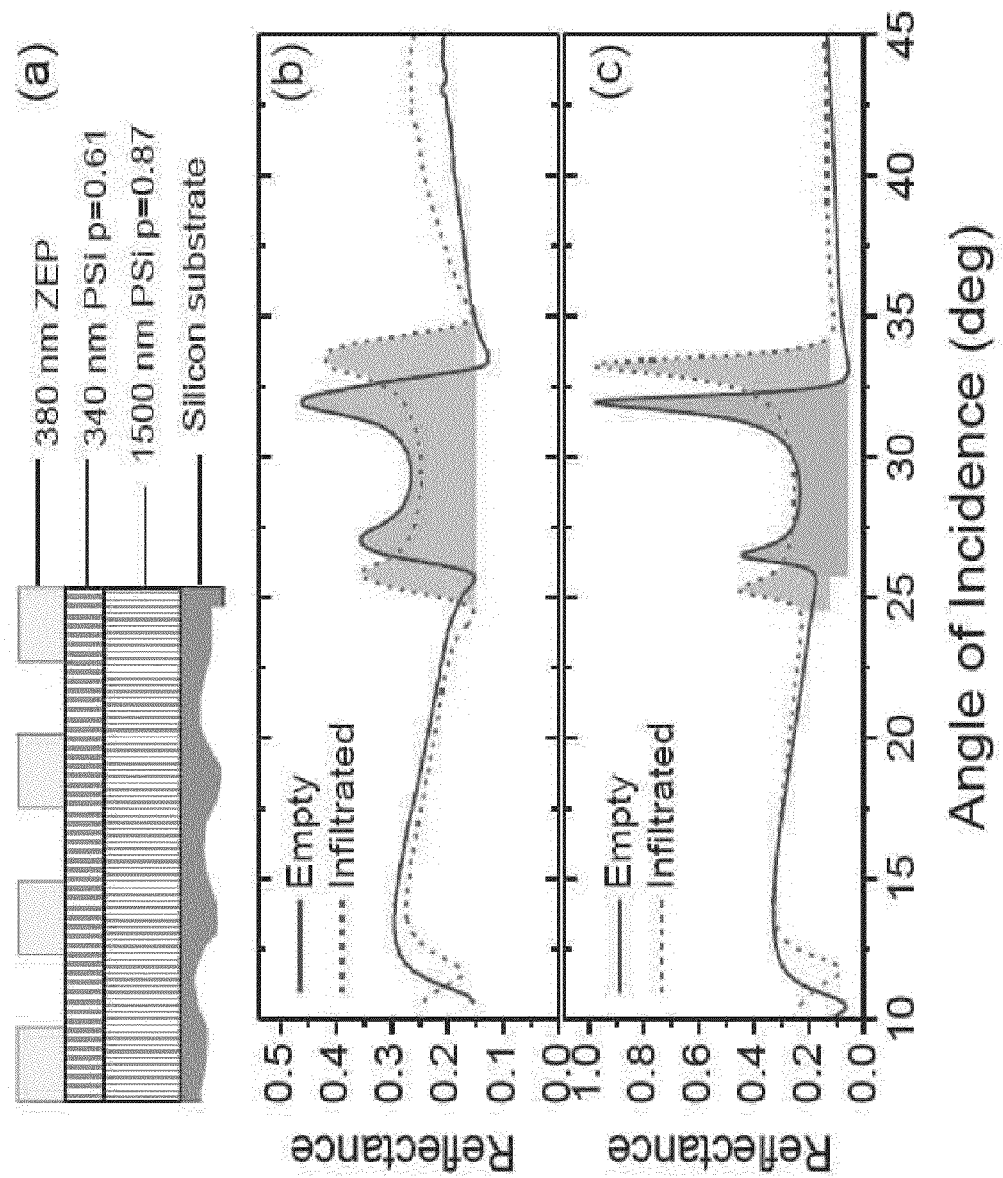
FIG. 28 shows a) a modified waveguide sensor of the invention and b) measured and c) calculated angle resolved reflectance shifts upon introducing 3-APTES.

The sensor was tested by introducing 3-aminopropyltriethoxysilane (3-APTES), which contains an amino group and is commonly used in sensing applications to promote adhesion between silica substrates and organic materials. FIG. 28 b) shows the experimental reflectance spectra of the grating-coupled waveguide before and after the infiltration. The reflectance peaks are associated with guided modes excited via the grating. The infiltration leads to the formation of an almost atomic layer of 3-APTES on the surface of the PSi pores, and to an increase of the PSi refractive index in the regions that are not covered by photoresist. The peak at the larger angle in FIG. 28 is associated with a guided mode strongly localized in the waveguide core. As a consequence of the increase in refractive index, the splitting of the peaks is enhanced. The shifted peaks are at 25.8° and 33.6°, respectively, for a total splitting of 7.7°, which is almost 3° larger than what is observed with the empty waveguide.

A theoretical model may be used to confirm that the splitting can indeed be understood as due to the infiltration of the waveguide. See, M. Liscidini, et al. *Physical Review B* (2008) vol. 77, 035324, incorporated herein by reference in its entirety. In FIG. 28 c) calculated reflectance spectra is plotted for the empty and infiltrated structures. A good agreement is found with the experimental results when refractive index changes $n_{core}$=0.03351 and $n_{buffer}$=0.03769 are assumed. Overall, the agreement is excellent.

Example 6

Selective Detection of Complimentary DNA Strand

Figure 29:
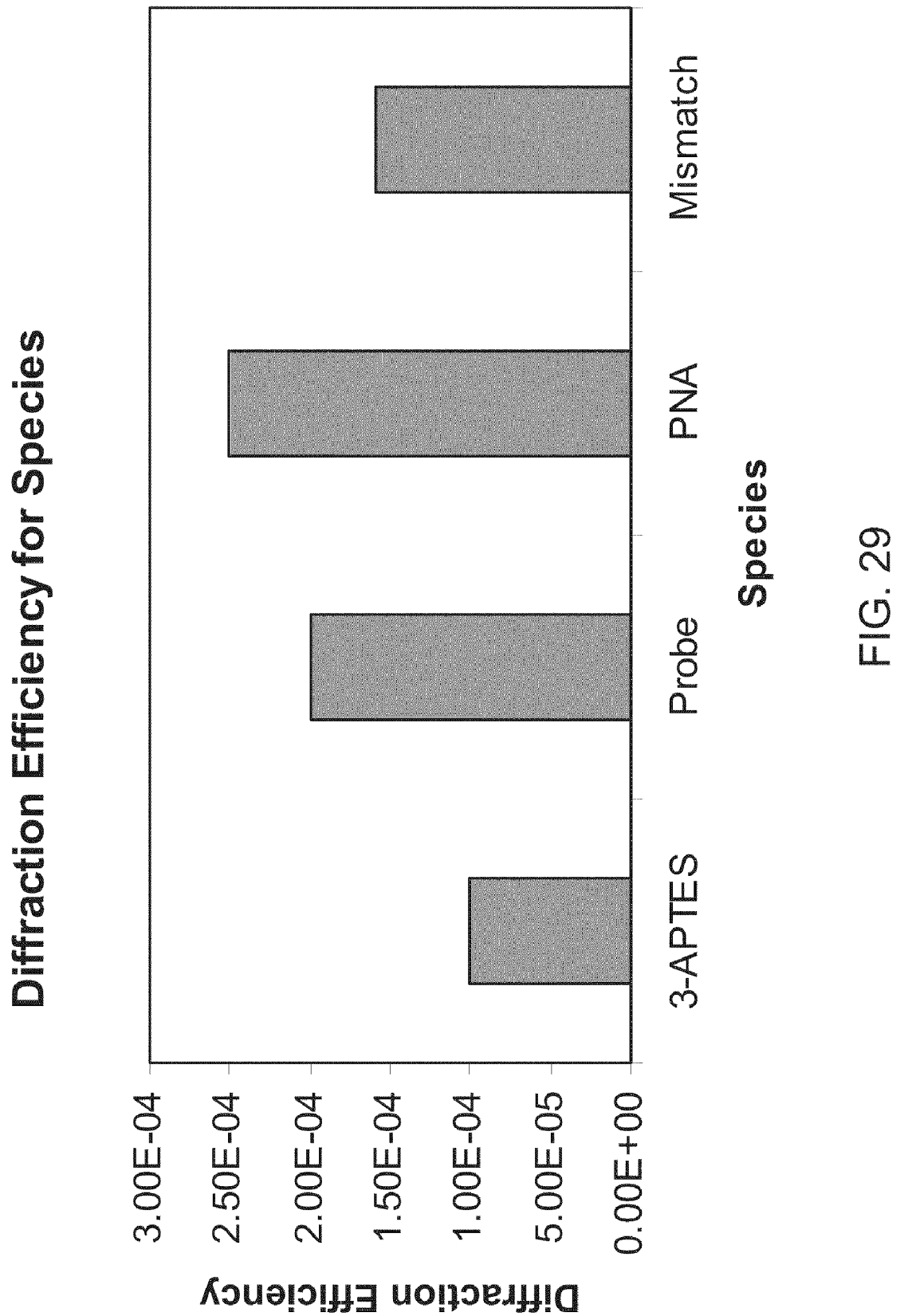
FIG. 29 shows diffraction efficiency for a sensor comprising a porous diffraction grating as a function of adsorbed species.

Using a stamped porous silicon diffraction grating similar to that described in EXAMPLE 2 and shown in FIG. 23, a diffraction-based sensor was constructed using a laboratory He—Ne laser and a photodiode centered on the fourth diffraction order of the beam off the diffraction grating. First 3-aminopropyltriethoxysilane (3-APTES) was introduced to the grating. 3-APTES contains an amino group and is commonly used in sensing applications to promote adhesion between silica substrates and organic materials. As shown in FIG. 29, the introduction of 3-APTES resulted in a small increase in the diffraction efficiency to the fourth order.

After addition of 3-APTES, sulfo-SMCC and a 16 mer DNA probe were applied to the grating resulting in an additional increase of diffraction efficiency to the fourth order. See FIG. 29. The 16 mer probe is bound to the interior pores of the porous silicon of the grating at this point. Adding a complimentary strand PNA results in further binding to the interior of the grating, leading to further increases in diffraction efficiency. (See "PNA" in FIG. 29)

In contrast, when the experiment is repeated by cleaning the grating and reintroducing the 16 mer DNA probe and then a mismatched DNA oligomer, the diffraction efficiency into the fourth order actually decreases, suggesting that the mismatched DNA is not binding. (See "Mismatch" in FIG. 29) Thus, the sensor shows the sensitivity to distinguish between matched and mismatched 16 mer DNA oliogos.

Thus, the invention provides, among other things, porous silicon diffraction gratings and sensors incorporating the gratings. Various features and advantages of the invention are set forth in the following claims.

What is claimed is:

1. A diffraction grating comprising a substrate having protrusions extending therefrom, the protrusions having a porosity of greater than about 10%, a height of less than about 100 µm, a width of less than about 100 µm, pores smaller than about 100 µm, and a porous interior functionalized with a selective binding species.

2. The diffraction grating of claim 1, wherein the protrusions are regularly spaced.

3. The diffraction grating of claim 1, wherein the protrusions have a height of less than about 1 µm.

4. The diffraction grating of claim 1, wherein the protrusions comprise at least one of silicon, gold, aluminum, copper, silver, germanium, tin, silicon dioxide, aluminum oxide, titanium dioxide, and mixtures thereof.

5. The diffraction grating of claim 4, wherein the protrusions have a porosity greater than about 70%.

6. The diffraction grating of claim 1, wherein the protrusions have a porosity greater than about 50%.

7. The diffraction grating of claim 1, wherein the protrusions have a width of less than about 10 µm.

8. The diffraction grating of claim 1, wherein the protrusions have a height of less than about 200 nm.

9. A sensor comprising:
a coherent light source producing a beam of coherent light;
the diffraction grating of claim 1;
a detector configured to receive a portion of the beam of light reflected from the diffraction grating and configured to measure an amplitude thereof.

10. The sensor of claim 9, wherein the selective binding species comprises at least one of a nucleotide, an antibody, biotin, streptavidin and a combination thereof.

11. The sensor of claim 9, wherein the coherent light source is a laser.

12. The sensor of claim 9, wherein the detector is a charge coupled device (CCD) array.

13. A method of detecting an analyte comprising:
a) measuring a first amplitude of a portion of a beam of coherent light reflecting off a diffraction grating, the diffraction grating comprising a substrate having protrusions extending therefrom, the protrusions having a porosity of greater than about 10%, a height of less than about 100 µm, a width of less than about 100 µm, pores small than about 100 µm, and a porous interior functionalized with a selective binding species;
b) contacting the diffraction grating with a fluid suspected to contain an analyte of interest;
c) subsequently measuring a second amplitude of a portion of a beam of coherent light reflecting off the diffraction grating;
d) comparing the first amplitude and the second amplitude to determine if the analyte of interest is present in the fluid, wherein a difference between the second amplitude compared to the first amplitude is indicative of the presence of the analyte.

14. The method of claim 13, wherein the analyte of interest is a nucleic acid oligomer, a protein, or a metabolite.

15. The method of claim 13, wherein the height is less than about 1 µm.

16. A diffraction grating comprising:
a) a substrate;
b) a first porous material adjacent to the substrate, the first porous material having a first porosity of greater than about 10%, the first porous material comprising a porous interior functionalized with a selective binding species;
c) a second porous material adjacent to the first porous material, the second porous material having a second porosity of greater than about 10%, wherein the first porosity is greater than the second porosity; and
d) protrusions extending from the second porous material and having a width of less than about 10 µm, a height of less than about 100 µm.

17. The diffraction grating of claim 16, wherein the protrusions have a porosity of greater than about 10%.

18. The diffraction grating of claim 17, wherein the protrusions comprises at least one of silicon, gold, aluminum, copper, silver, germanium, tin, silicon dioxide, aluminum oxide, titanium dioxide, and mixtures thereof.

19. The diffraction grating of claim 16, wherein the protrusions comprise a polymeric resist.

20. The diffraction grating of claim 19, wherein the protrusions comprise an electron beam photoresist.

21. The diffraction grating of claim 16, wherein at least one of the first porous material and the second porous material comprises at least one of silicon, gold, aluminum, copper, silver, germanium, tin, silicon dioxide, aluminum oxide, titanium dioxide, and mixtures thereof.

22. The diffraction grating of claim 16, wherein the first porosity is greater than about 50%.

23. The diffraction grating of claim 16, wherein the first porosity is greater than about 70%.

24. The diffraction grating of claim 16, wherein the protrusions have a width of less than about 2000 nm.

25. A sensor comprising:
a coherent light source producing a beam of coherent light;
the diffraction grating of claim 16; and
a detector configured to receive the portion of the beam of light reflected from the diffraction grating, and configured to measure a spatial distribution thereof.

26. The sensor of claim 25, wherein the porous material comprises at least one of silicon, gold, aluminum, copper, silver, germanium, tin, silicon dioxide, aluminum oxide, titanium dioxide, or a mixture thereof.

27. The sensor of claim 25, wherein the protrusions have a width of less than about 2000 nm.

28. The sensor of claim 25, wherein the selective binding species comprises a nucleotide, an antibody, biotin, or streptavidin.

29. The sensor of claim 25, wherein the coherent light source is a laser.

30. The sensor of claim 25, wherein the detector is a charge coupled device (CCD) array.

31. A method of detecting an analyte comprising:
a) measuring a first spatial distribution of a portion of a beam of coherent light reflecting off a diffraction grating, the diffraction grating comprising (i) a substrate, (ii) a first porous material adjacent to the substrate, the first porous material having a first porosity of greater than about 10%, the first porous material comprising a porous interior functionalized with a selective binding species, (iii) a second porous material adjacent to the first porous material, the second porous material having a second porosity of greater than about 10%, wherein the first porosity is greater than the second porosity, and (iv) protrusions extending from the second porous material and comprising a polymer resist, the protrusions being adjacent to the second layer of porous material and having a width of less than about 10 µm and a height of less than about 100 µm;
b) contacting the diffraction grating with a fluid suspected to contain an analyte of interest;

c) subsequently measuring a second spatial distribution of a portion of a beam of coherent light originating from the coherent light source and reflecting off the diffraction grating; and
d) comparing the first spatial distribution and the second spatial distribution to determine if the analyte of interest is present in the fluid, wherein a difference between the second spatial distribution compared to the first spatial distribution is indicative of the presence of the analyte.

32. The method of claim 31, wherein the analyte of interest is a nucleic acid oligomer, a protein, or a metabolite.

* * * * *